(12) United States Patent
Giefer et al.

(10) Patent No.: US 8,051,740 B2
(45) Date of Patent: Nov. 8, 2011

(54) ACTUATING DEVICE WITH ROTARY SWITCH

(75) Inventors: Andreas Giefer, Lemfoerde (DE); Joerg Meyer, Wagenfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1151 days.

(21) Appl. No.: 11/813,903

(22) PCT Filed: Jan. 11, 2006

(86) PCT No.: PCT/DE2006/000030
§ 371 (c)(1),
(2), (4) Date: Jul. 13, 2007

(87) PCT Pub. No.: WO2006/074645
PCT Pub. Date: Jul. 20, 2006

(65) Prior Publication Data
US 2008/0115613 A1    May 22, 2008

(30) Foreign Application Priority Data
Jan. 14, 2005   (DE) .......................... 10 2005 002 086

(51) Int. Cl.
*B60K 20/00*   (2006.01)

(52) U.S. Cl. .................................................. 74/473.21

(58) Field of Classification Search .................. 74/473.1, 74/473.21, 473.25, 473.3, 553; 701/51; 200/61.88, 200/61.91
See application file for complete search history.

(56) References Cited

U.S. PATENT DOCUMENTS

| 4,378,474 | A  |   | 3/1983 | Olson |
| 5,012,056 | A  | * | 4/1991 | Abel et al. ..................... 200/519 |
| 5,862,715 | A  | * | 1/1999 | Lemire ........................... 74/553 |
| 6,404,354 | B1 |   | 6/2002 | Decker et al. |
| 2004/0093968 | A1 |   | 5/2004 | Oster |

FOREIGN PATENT DOCUMENTS

| DE | 44 22 257 C1 | 11/1995 |
| DE | 100 59 794 A1 | 6/2002 |
| EP | 1 229 272 | 8/2002 |
| EP | 1 484 661 A1 | 12/2004 |

* cited by examiner

*Primary Examiner* — Vicky Johnson
(74) *Attorney, Agent, or Firm* — McGlew and Tuttle, P.C.

(57) ABSTRACT

An actuating device is provided for selecting gears of an automatic transmission. The actuating device includes a rotatable actuating element as well as a crank arrangement (9) with stop elements (Mn) for limiting the rotation angle of the actuating element to a total switching angle. The actuating element may assume n switching positions within the total switching angle. The crank arrangement (9) has a separate stop element (Mn), which can be activated in a controlled manner, and a crank area (12, 13) for each of the n switching positions. The crank area (12, 13) comprises at least one crank segment (A, B, C, ... ), between the end stops of which a stop element (Mn) can assume one of n relative positions, which correspond to the n switching positions. The crank segments (A, B, C, ... ) are arranged distributed over the total crank angle such that all n relative positions are occupied by the n stop elements (Mn) for each relative switching position (1, 2, 3, ... ). The actuating device makes possible, analogously to purely mechanical actuating elements with discrete locking position, the reliable actuation of complex technical systems. At the same time, intuitively detectable and especially tactile feedback, which is unambiguous under all operating conditions, is achieved for the actual state of the system.

24 Claims, 16 Drawing Sheets

ACTUATING DEVICE WITH ROTARY SWITCH

CROSS REFERENCE TO RELATED APPLICATIONS

This application is a United States National Phase application of International Application PCT/DE2006/000030 and claims the benefit of priority under 35 U.S.C. §119 of German Patent Application DE 10 2005 002 086.0 filed Jan. 14, 2005, the entire contents of which are incorporated herein by reference.

FIELD OF THE INVENTION

The present invention pertains to an actuating device with rotary switch for actuating a technical system such as an automotive technical system for selecting gears of a shift-by-wire gear change mechanism.

BACKGROUND OF THE INVENTION

Devices of this type are used, for example, but by no means exclusively, for the manual actuation of the gears or for gear preselection in gear change mechanisms of motor vehicles.

Actuating device of the type mentioned in the introduction are used in motor vehicles to actuate a great variety of systems and functions of the motor vehicle. Numerous systems and functions are operated electrically or controlled electronically in modern motor vehicles. This applies both to complex mechanical assembly units of the powertrain, for example, manually or automatically controlled vehicle transmissions, and simpler functions, such as electric seat adjustment, windshield wiper drives, to diverse electronic systems in the vehicle and the like. However, gear preselection and control of the operating state of the vehicle transmission, in particular, take place exclusively by means of electric or electronic signaling ("shift-by-wire") in an increasing number of motor vehicles.

However, the electric or electronic activation of such systems, which makes do without mechanical connection, leads to the circumstance that there will not be an unambiguous assignment any longer between the position of an actuating element and the state of the system that can be controlled by means of the actuating element, for example, a vehicle transmission. In other words, this means that the desired state of the system being controlled, for example, of the vehicle transmission, which is selected with the actuating element, does not agree with the actual shifting state of the system or transmission.

Such a divergence between the states of a technical system and the control elements thereof may have various causes.

For example, erroneous or non-functioning recognition of the position of the control element may be involved, with the consequence that the gear, preselected, for example, by the driver on the control element, was not recognized by the system and the corresponding control command was consequently not sent to the transmission. For example, erroneous or non-functioning transmission of the control command between the control element and the system controlled therewith is equally imaginable as well.

However, the situation in which technical systems, for example, vehicle transmissions, adapt their operating or shifting state to changed general conditions and change it automatically even without direct action of the driver, also occurs increasingly frequently in modern motor vehicles with the complex technical systems, which are increasingly interlinked with one another. For example, it is not uncommon that an electronic or shift-by-wire-controlled vehicle transmission automatically assumes the shift position P (parking brake) for safety reasons when the engine is stopped and after the ignition key is removed or as soon as the driver leaves the vehicle.

However, if the vehicle is equipped with a usual transmission actuating element, for example, with an automatic selector lever, the selector lever remains in the shift position selected manually by the driver before, for example, in "N," even in case of the automatically engaged shift position "P." The control lever thus falsely signals by its unchanged position in the "N" position that the transmission is in shift position "N," whereas the transmission is actually in shift position "P" because of the automatic activation of the parking brake. While this may not directly lead to a safety risk in the example selected here, at least the problem still remains that the selector lever is in the "N" position when travel is next started, and difficulties or lack of clarity could therefore arise when engaging the desired gear.

The comparatively simple case in which the system being controlled is the windshield wiper unit of a vehicle is another example, which is used for illustration only. It is already known in this case as well that the windshield wiper turns on automatically because of corresponding sensor signals, for example, when heavy fog develops or when precipitation begins. However, this means that the operating state of the windshield wiper may no longer possibly agree with the switching state of the actuating element for the windshield wiper.

Thus, the actuating element falsely signals by its unchanged position in the off position that the windshield wiper is turned off, whereas it is actually in operation because of the automatic activation. Even if the actual operating state may also be easily recognizable in case of the windshield wiper, at least the problem still remains that the actuating element is already in the off position during the manual intervention in the automatic windshield wiper mechanism, which may possibly be desirable, i.e., to turn off the windshield wiper.

As can easily be seen, the cases from the area of the motor vehicle or the gear box control are only examples of generally applicable relationships in the man-machine interaction in case of electronically controlled technical systems, in which the actuating elements are not in connection with the system to be controlled via mechanical linkages or shafts any longer, but only via electric or electronic signals.

To solve the problem that there is not always an agreement between the position of the actuating element and the state of the system being controlled by means of the actuating element, it was proposed in the state of the art that such technical systems, especially automated vehicle transmissions, be actuated by means of an essentially rotationally symmetrical rotary switch, wherein the rotary switch is unlimitedly rotatable by itself.

The actuation position of the rotary switch which corresponds to the actual sate of the system to be controlled or to the actually engaged gear of the automatic transmission is set in this actuating device by means of the active adjustment of mobile end stops for the rotary switch. The adjustment of the end stops is performed in a variable manner as a function of the actual state of the system or the actually engaged gear. It is ensured in this manner that the relative position of the rotary switch between the end stops always agrees with the actual state of the system regardless of the switching position being assumed by the rotary switch and regardless of whether the state of the system was changed without an intervention on the part of the user.

However, this adjustment or motor-driven adaptation of the position of the end stops to the actual state of the system does require a certain effort. Moreover, the motor-driven adjustment of the end stops always takes a certain time until the end stops reach the intended position, and this adjustment time also varies, moreover, with the degree of deviation between the actual position and the desired position of the stops.

In addition, selective blocking of certain gear selection possibilities on the actuating element or rotary switch is desirable or necessary in certain cases, for example, in case of the control of an automatic transmission. For example, the driver must be prevented for safety reasons from engaging the reverse gear above a certain forward travel speed to prevent damage to the powertrain. However, besides the adjustment of the end stops for the rotary switch, a possibility of selective blocking or a possibility of controllably changing the distance between the two end stops of the rotary switch would be additionally necessary for this, but this would require a considerable additional design effort.

SUMMARY OF THE INVENTION

Against this background, the object of the present invention is to provide a means for the electronic or generally by-wire actuation of a technical system, with which the drawbacks of the state of the art can be overcome. In particular, the actuating device shall make possible just as intuitive and easily understandable an actuation of the technical system as this has ever been possible in case of mechanical or electro-mechanical actuating elements, for example, rotary switches or the like. Along with a compact, simple and robust design, the actuating device shall at the same time also permit the selective blocking of individual shift positions, of a plurality of shift positions or all shift positions of the actuating element. The immediate, intuitive and unambiguous visual and/or tactile feedback on the state of the system during the control of the corresponding actuating element shall also be an important aspect.

The actuating device according to the present invention comprises at first an actuating element, which is unlimitedly rotatable by itself, as well as a blocking means with a crank arrangement and stop elements for limiting the angle of rotation of the actuating element to the range within the intended total switching angle. The actuating element may assume two or more switching positions within the total switching angle. The number of possible switching positions is designated by the integer "n" for the sake of clarity, where {n is greater than 1}.

The actuating device according to the present invention is such that the crank arrangement has a crank area and a stop element for each of the n switching positions of the actuating element. Each crank area comprises at least one crank segment, which extends over the total switching angle, the stop element belonging to the crank area being arranged such that it can assume n relative positions between the end stops of the corresponding crank segment, which said relative positions correspond to the n switching positions of the actuating element. The crank segments of the n crank areas extend, taken together, over a total crank angle of 360° or a multiple thereof. Furthermore, the crank segments and/or the stop elements are arranged distributed over the total crank angle such that exactly each of the n relative positions is occupied by exactly one stop element in any possible relative switching position of the actuating element.

In other words, this means at first that the actuating element has no defined start and end positions and no defined absolute switching positions for the time being because it has unlimited rotatability by itself. Both the start position and the end position as well as the switching positions of the actuating element are rather set dynamically by the cooperation of the individual controllable stop elements with the particular assigned crank segments, namely, as a function of the actual instantaneous state of the technical system being controlled and of the absolute angular position of the actuating element or the crank arrangement.

By contrast, a conventional actuating device, for example, a rotary switch, can assume only a number of unchangeable switching positions within a total switching angle, which is set in terms of its angular position and the size of the angle. In such an actuating device, the angle of rotation is limited at the actuating element in such a form that a stop element connected to the actuating element can move between the end stops of a crank area. The rotary switch can thus assume a number of switching positions between a fixed left stop (end stop of the crank area during rotation to the left) and a fixed right stop (end stop of the crank area during rotation to the right).

The actuating device according to the present invention differs herefrom first in that not only one crank and one stop element are present, as, for example, in the rotary switch, but that a separate stop element as well as a separate crank area are rather provided for each of the switching positions which the actuating element can assume. If the actuating device according to the present invention has, for example, n=four switching positions, the actuating device likewise comprises n=four stop elements, which can, moreover, be activated in an individually controllable manner, as well as n=four crank areas. Each crank area now comprises at least one crank segment.

The key to the present invention is especially that the crank segments taken together cover a full revolution of 360° or a multiple thereof, whereas the crank segments or the stop elements, or the crank segments and the stop elements are arranged distributed along the total crank angle such that all n=four possible relative positions, which each of the n=four stop elements can assume within one crank segment (i.e., "left stop"—"middle left stop"—"middle right stop"—"right stop" in the case of the example), are occupied by exactly one of the stop elements for any desired relative switching position of the actuating element.

The term "relative switching position" shall cover not only the n possible switching positions of the actuating element within the total switching angle (crank segment angle), but also all potential switching positions which the actuating element can assume along an entire 360° revolution. If the actuating device is designed, for example, such that the actuating element can assume four different switching positions within a total switching angle of 135°, this means, under the assumption of uniform switching distances, that the individual switching positions are separated each by a switching angle of 45°(135° divided by three spaces–4 switching positions including both end stops=45°) between the switching positions. The by itself unlimitedly rotatable actuating element can thus assume a total of (360° divided by 45°)=eight relative switching positions.

Against this background, it is possible according to the present invention to define at any time the switching position or the system state to which the instantaneous relative switching position of the actuating element shall correspond for any desired relative switching position of the actuating element by selecting one of the four stop elements. Consequently, whether the actuating element shall consequently be located, for example, at the left stop, at the right stop or in another of the other switching positions can be set at any time by a suitable control, without the actuating element having to be occupied or rotated for this.

The principle of action shall be illustrated first with the simple example of the actuation of the windshield wiper. In the case of the example, the windshield wiper unit comprises an actuating element with two switching positions, which is, however, unlimitedly rotatable by itself, for example, an essentially round rotary switch. It shall be signaled by corresponding symbols on the rotary switch or in the area around the rotary switch that the windshield wiper is turned on by turning the rotary switch to the right and is turned off by turning the rotary switch to the left. This simple principle of operation is immediately understandable and will be able to be internalized by the driver of the motor vehicle in a very short time.

The actuating device designed according to the present invention comprises in the example of the on-off actuation of a windshield wiper only two crank arrangements, as well as two stop elements, which can be activated, for example, by a electronic control unit. The crank segments of the crank arrangements or the stop elements are arranged distributed in such a manner that one of the stop elements is always located at the left stop and one of the stop elements is located at the right stop of one of the crank segments for each of the relative switching positions which the rotary switch can assume along a full 360° revolution. In other words, two relative positions ("left stop" and "right stop") are always occupied in this case according to the present invention by the two stop elements for any possible relative switching position of the actuating element. Whether the rotary switch is indeed located, mechanically and perceptibly to the operator, at the left stop or at the right stop can thus be determined in any possible relative switching position of the rotary switch by simply activating one of the two stop elements and simultaneously deactivating the other stop element.

It shall be assumed for the case of the example that the windshield wiper is first turned off. A electronic control unit ensures in this case that the stop element that is at the corresponding left stop of its crank arrangement in the instantaneous position of the rotary switch remains activated. Thus, the rotary switch is also at its left stop mechanically and in such a manner that it is perceptible to the operator (corresponding to the "Off" position) and can be turned only to the right.

Thus, to turn on the windshield wiper, the rotary switch is simply turned to the right until the rotary motion of the rotary switch is limited by the stop element, which continues to be activated, coming into contact with the corresponding right stop of its crank arrangement, which corresponds to the "On" position of the rotary switch as well as of the windshield washer. Thus, the driver intuitively knows after a few actuations that a rotary switch turned to the right up to the "On" stop corresponds to a turned-on windshield washer and a rotary switch turned to the left up to the "Off" stop corresponds to a turned-off windshield washer. This manner of actuation corresponds, in principle, to the widespread, simple principle of the rotary switch, which can be encountered since time immemorial on a great variety of devices and machines, beginning from electric household appliances to safety-relevant switching means, for example, in power plants, via common switches on motor vehicles.

However, if—in this example of the actuation of the windshield washer—the windshield washer is turned on automatically because of a beginning precipitation thanks to a rain sensor present on the vehicle, the agreement between the switching position of the actuating element and the operating state of the technical system being controlled, i.e., the windshield washer here, would be eliminated in the case of a conventional actuating element. If the driver wanted to intervene with the automatic actuation of the windshield washer and turn this off again manually, he could not simply turn the windshield washer rotary switch intuitively to the left to the "Off" stop because the rotary switch would continue to be, without any change, already at the left "Off" stop. Thus, a separate possibility of intervening with the automatic system has to be created, which would make necessary, for example, either an additional reset button, or it would make it impossible to use an actuating element with discrete switching positions. Both would be to the detriment of ergonomics and would prevent the ability of the system to be operated in the desired intuitive manner.

This is where the present invention begins, in which the switching position of the rotary switch can be redefined by changing the state of activation of the stop element as a function of the actual instantaneous operating state of the system to be controlled, without the actual switching position of the rotary switch having to be changed for this. In other words, this means in this example that the states of activation of the two stop elements are transposed by the electronic control unit of the actuating device for the case of the automatic activation of the windshield wiper when it is beginning to rain. In other words, the previously active stop element (which is located at the corresponding left stop of its crank arrangement) is deactivated or retracted, while the previously inactive stop element (which is located at the corresponding right stop of its crank arrangement) is activated and extended.

The rotary switch cannot be turned to the right any longer, but only a motion of the rotary switch to the left can take place, even though the rotary switch had still been in the same absolute position shortly before at the left stop and consequently in the Off position. This means for the driver that without thinking and without consulting a complicated display means, he can reach, ever so simply, for the rotary switch and he can simply turn it to the left up to the "Off" stop, as he was used to do to turn off the windshield washer.

Compared to the rotary switch mentioned in the introduction with adjustable end stops, the actuating device according to the present invention has, as was already explained, especially the advantages of an especially simple and robust design, the possibility of activating the stop elements practically without delay, as well as—in actuating device with more than two switching positions—the possibility of changing the angle of rotation ranges for the actuating element without any problem, and the possibility of selecting blocking only some of the switching positions or switching ranges.

It is immediately obvious from what was said that such an intuitive control of technical systems, for example, of vehicle transmissions, is both advantageous for the comfort of operation and effectively prevents potential safety risks due to complicated control elements or control concepts.

To embody the present invention, the design of the crank areas or crank segments of the crank arrangement is at first irrelevant as long as the complete rotation of the actuating element by 360° is covered and as long as, in particular, all n relative positions between the stop element and the crank segment are completely occupied by stop elements for each possible relative switching position which the actuating element can assume. For example, a completely separate crank area of its own with one or more crank segments, which are likewise assigned exclusively to this stop element, may thus be provided for each stop element.

However, a plurality of crank areas or crank segments are integrated in a multiple crank area or multiple crank segment according to an especially preferred embodiment of the present invention, and a plurality of stop elements are assigned to the multiple crank area or multiple crank segment. The number of stop elements assigned to the multiple crank area or multiple crank segment is equal to the number of crank areas or crank segments that were integrated or caused to overlap in the multiple crank area or multiple crank segment.

The background of this embodiment is that all crank segments of the actuating device according to the present invention extend over the same angle, namely, over the total switching angle of the actuating element. In other words, this means that the crank segments can be positioned in the crank arrangement from a plurality of crank areas of the actuating device or even from all crank areas of the actuating device by a clever arrangement—or rotation about the axis of rotation of the actuating element—of both the crank segments and of the stop elements belonging to them such that a plurality of crank areas or crank segments and possibly even all crank areas and crank segments can be caused to overlap each other.

This is especially advantageous because a considerable amount of space needed for installation can be saved hereby. Furthermore, the design of the actuating device can be made simpler and the actuating device can thus be made more robust and less expensive.

Against this background, the terms "crank area" and "crank segment" shall be defined in the sense of the patent claims and the specification such that even when a multiple crank area is present, which is composed of a number of m {m>1} congruent or overlapped crank areas of m different stop elements—or when a multiple crank segment is present, which is composed of a number of m {m>1} overlapped crank segments of m different stop elements, this multiple crank area or this multiple crank segment shall be counted, as before, as m crank areas or m crank segments.

In other words, the term "crank area" according to the patent claims and the specification covers both "independent" crank areas separated in space for different stop elements and overlapped "logic" crank areas for different stop elements. The term "crank segment" likewise covers both "independent" crank segments separated in space for different stop elements and overlapped "logic" crank segments for different stop elements.

The design and the shape of the crank areas or crank segments are irrelevant for embodying the present invention as long as the geometric requirements are met especially regarding the total crank angle and the necessary distribution of the crank segments over the total crank angle. For example, an embodiment of the present invention is conceivable according to which the crank areas correspond to longitudinal sections of the surface of a cylindrical body, in other words, they are arranged on the surface of a cylinder, while the stop elements belonging to them are arranged in the radial direction in relation to the cylinder.

According to another embodiment of the present invention, the crank arrangement is, however, essentially annular, and a certain annular partial surface area of the crank arrangement is preferably assigned to each crank area of the crank arrangement. This embodiment has especially the advantage of having an especially space-saving, compact and robust design.

Provisions are made according to another embodiment of the present invention for the same partial surface area of the crank arrangement to be assigned to a plurality of or all crank areas of the crank arrangement. In other words, this means that a plurality of crank areas or even all crank areas occupy one and the same crank area of the crank arrangement and that these ("logic") crank areas or the ("logic") crank segments of these crank areas are thus congruent.

The concrete shape of the actuating element is at first nonessential for the present invention as long as handy and reliable operation of the actuating element is possible regardless of the rotation position thereof. However, the actuating element is preferably essentially of a rotationally symmetrical design and preferably has especially no angle-specific shape or color marking. It is avoided as a result that the operator or, in the case of a motor vehicle, the driver would falsely identify a certain relative switching position of the actuating element with a certain state of the system to be controlled.

According to another preferred embodiment of the present invention, the actuating element has a number of locking positions corresponding to the number of possible relative switching positions, which said locking positions are especially preferably distributed uniformly over a full revolution of the actuating element, i.e., over 360 degrees. It was found that actuating elements with defined locking positions are preferred by the majority of operators because there is a defined tactile feedback on the switching operation due to the locking positions which are perceptible during actuation. This is especially true of actuating device that comprise more than two switching positions and in which the system to be controlled can correspondingly assume more than two different operating states.

The locking means preferably has a circumferential locking contour and a spring-loaded locking element corresponding to the locking contour. The locking contour is preferably made in one piece here with a housing part of the actuating device, while the locking element is preferably connected to the crank arrangement. A locking means of such a design is advantageous because it requires only one component, has a simple and robust design and can, furthermore, be manufactured at low cost.

The type, arrangement and design of the activation for the stop elements are at first selectable as desired according to the present invention as long as the necessary linkage between the state of the system and the technical system to be controlled and the switching state of the actuating device is guaranteed. However, the means for the controlled activation of the stop element is comprised by the actuating device according to a preferred embodiment of the present invention. The actuating device preferably also now has a sensor array, which can be connected to the control means and which is used to determine the instantaneous relative switching position of the actuating element or the absolute angle of the crank arrangement.

According to another preferred embodiment, the actuating device has an actuator means, which can be connected to the control means, for each stop element. The actuator means is used here to activate the corresponding stop element and can be driven by an auxiliary energy, which can be fed to the actuator means via the control means. The actuator means is especially preferably set up such that the stop element is brought into the activated state or is held in the activated state when the auxiliary energy ceases to be present. This is especially advantageous because it is ensured in this manner that the actuating device is automatically blocked when the auxiliary energy ceases to be present, for example, in case of an accident. It is thus also immediately signaled to the operator that the system is not in the ready-to-operate state or cannot be controlled at present via the actuating device.

The type of the auxiliary energy for the drive of the actuator means is at first not essential for the embodiment of the present invention. However, the actuator means preferably has an electromagnetic drive for activating the stop element, and the stop element is preferably formed by an armature rod of the electromagnet of the actuator means in the sense of a simple, inexpensive and robust design.

Furthermore, the present invention can be embodied regardless of whether the crank means is connected to the actuating element or is arranged as a rigid part of the housing. However, the actuating device will have an especially simple design, as this is also provided for according to an especially preferred embodiment of the present invention, if the crank means is connected to the actuating element in such a way that they rotate in unison and the stop elements as well as the drives thereof are arranged at the same time as rigid parts of the housing.

Provisions are made according to other embodiments of the present invention for the actuating device to be connected to a display means, for example, to a display means in the area of the dashboard, or for the actuating device itself to comprise a display means, which may be arranged, for example, in the immediate area of the actuating element. The embodiments with a separate display means are advantageous especially in case of the actuation of technical systems whose state of operation is not immediately recognizable, unlike in the case of the windshield washer mentioned as an example in the introduction. The display means is used now, for example, to signal the current switching or operating state of the transmission in the immediate area of the actuating element, for example, in the area of the rotary switch for controlling a motor vehicle transmission.

Provisions are made according to another, preferred embodiment of the present invention for the display means to have a discrete, i.e., separate display element arranged separately in space for each switching position, the distances between the discrete display elements especially preferably corresponding to the angle difference between the switching positions or locking positions of the actuating element.

In other words, this means that exactly one separate display element, for example, a light-emitting diode field or the like, corresponds to each selectable switching position or locking position of the actuating element, and the distance between the individual display elements or luminous fields always agrees to the angle differences between the switching positions of the actuating element.

Together with the arrangement according to the present invention comprising crank segments and stop elements, the function and the mode of operation of the classical rotary switch is completely simulated in this manner, in which exactly one defined operating state of the switched system or system being controlled is assigned to each switching position and in which there are both visually and mechanically defined end positions or end stops in both directions of rotation. However, the principle of the controllable stop elements according to the present invention, whose state of activation can be adapted as a function of the actual, possibly automatically changed state of the system in order to thus guarantee the possibility of intuitive operation, tactile feedback as well as selective blockability of the actuating element, as was described above, in all states of the system, is, of course, maintained at the same time.

According to another embodiment of the present invention, the actuating device comprises, furthermore, a mechanical release for the manual deactivation of the stop elements. This is available as a so-called override function for the case of malfunctions of the actuators for the stop elements and/or of malfunctions of the actuator control, and it makes it possible in such a case, by means of a mechanical deactivation of the stop elements, that the actuating element can still be actuated in the sense of an emergency operation and emergency control of the system can thus take place.

The present invention will be explained in more detail below on the basis of exemplary embodiments only. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

Figure 13:
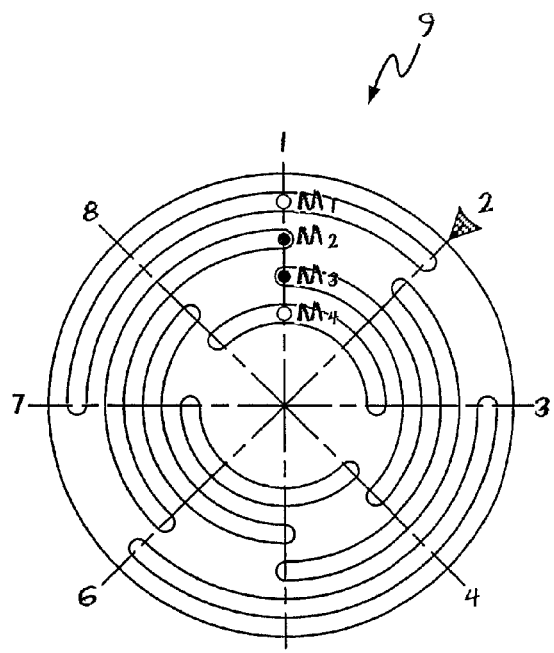
FIG. 13 is a schematic view of the crank arrangement and the stop elements of the blocking means according to FIGS. 8 through 12 in the second relative switching position with the transmission in position "P" and with the actuating element blocked (shift lock) in a view corresponding to FIGS. 8 through 12.
Figure 14:
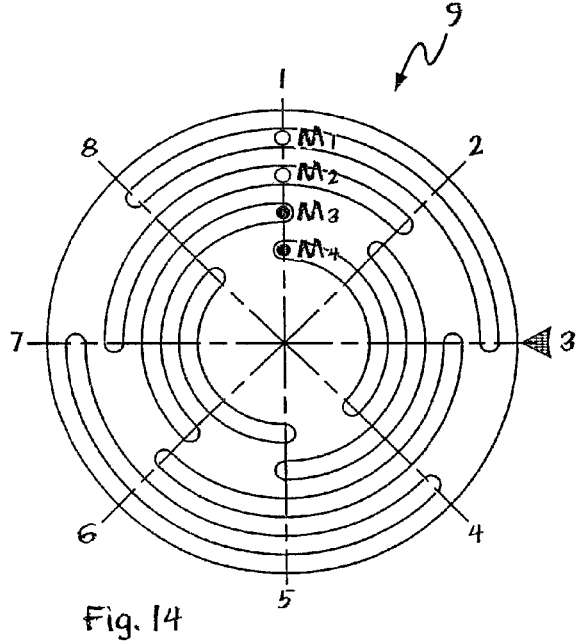
FIG. 14 is a schematic view of the crank arrangement and the stop elements of the blocking means according to FIGS. 8 through 13 in the third relative switching position with the transmission in position "P" and with the actuating element blocked (shift lock) in a view corresponding to FIGS. 8 through 13.
Figure 15:
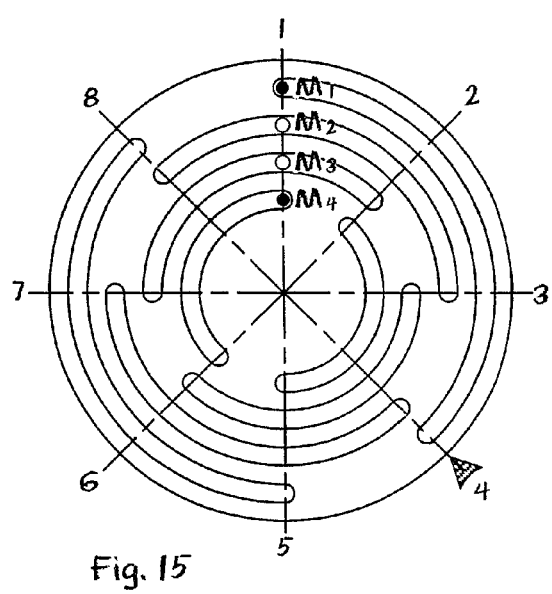
Figure 16:
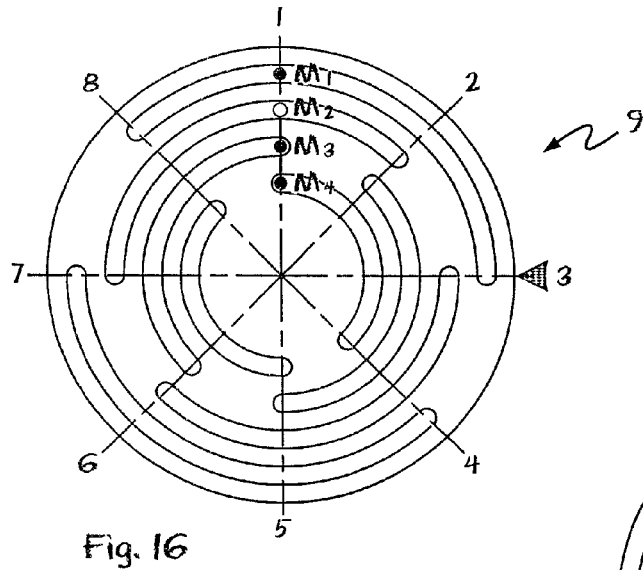
Figure 17:
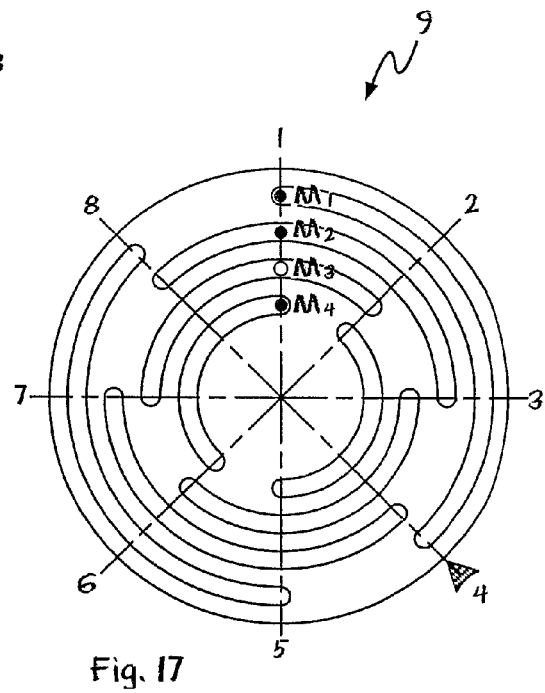
Figure 18:
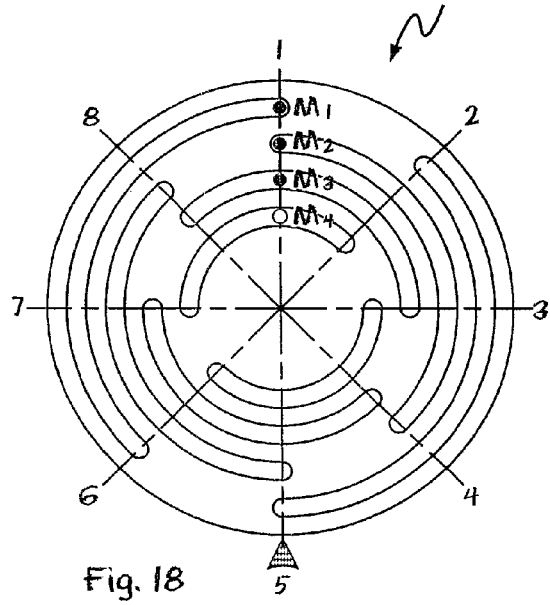
Figure 19:
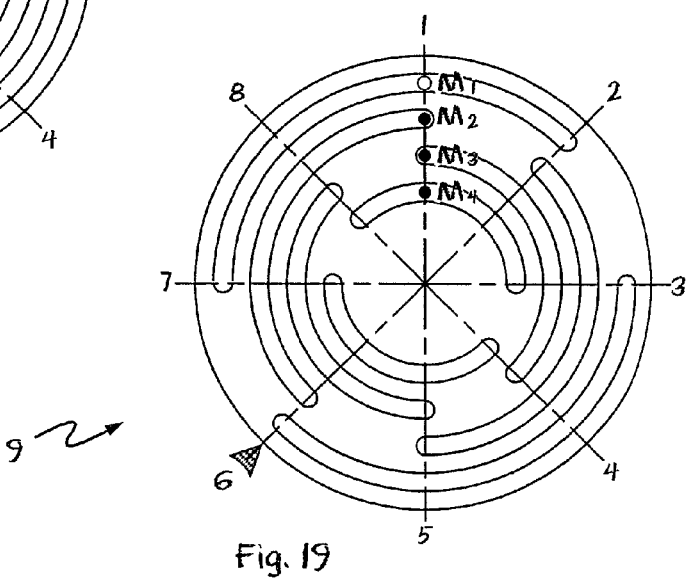
Figure 20:
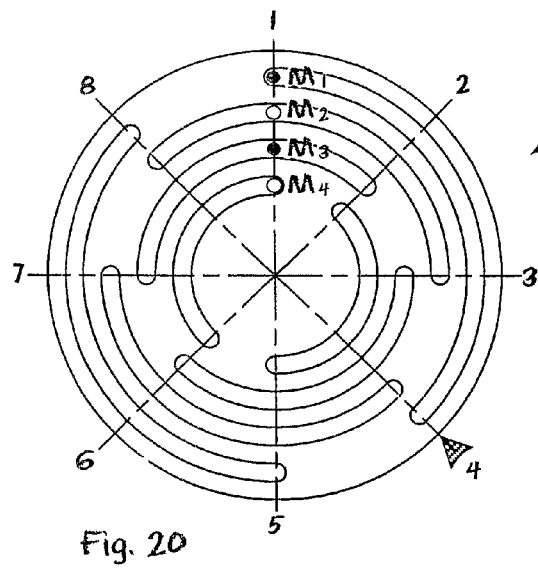
Figure 21:
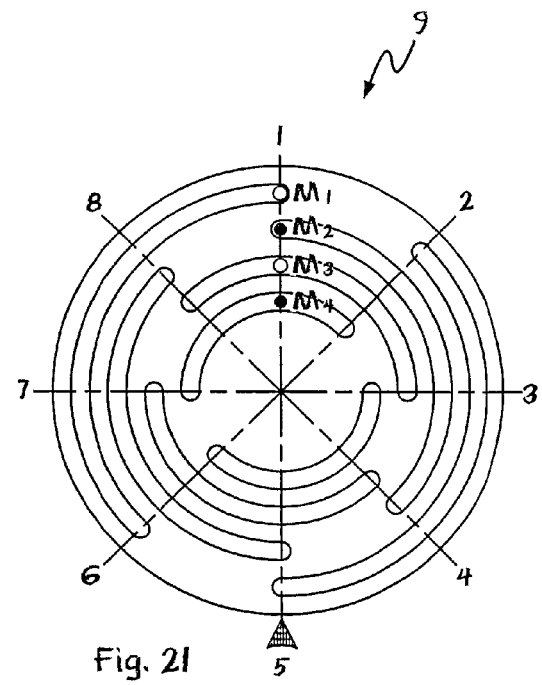
Figure 22:
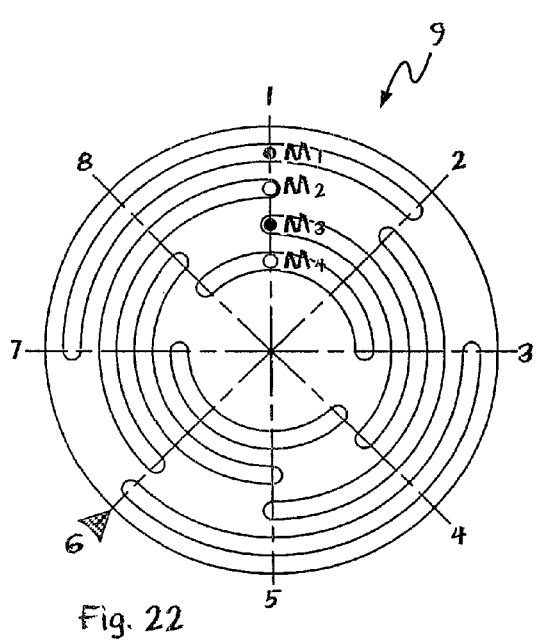
Figure 23:
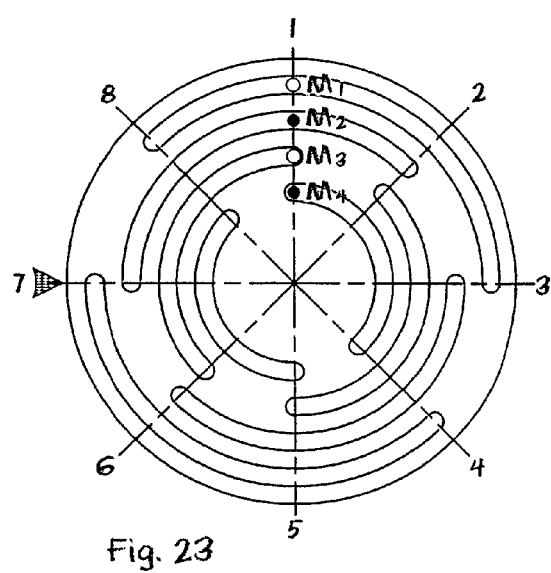
Figure 24:
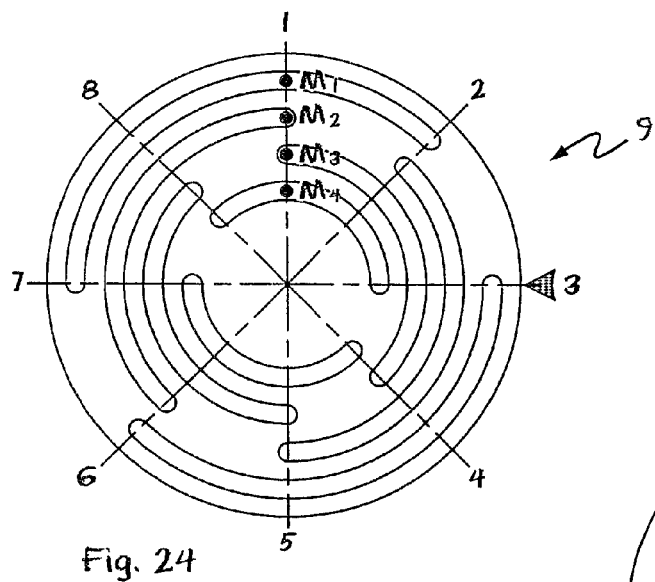
Figure 25:
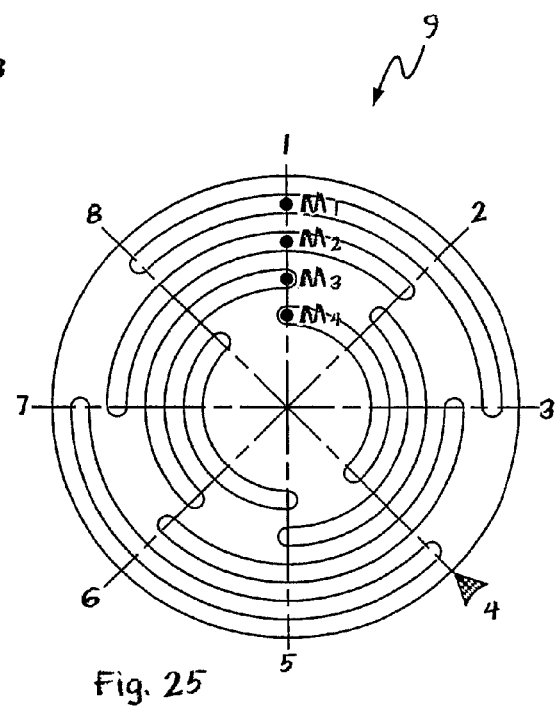
Figure 26:
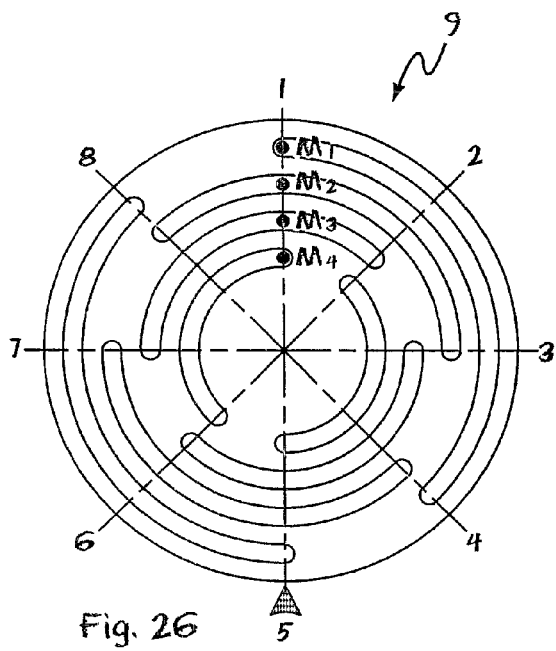
Figure 27:
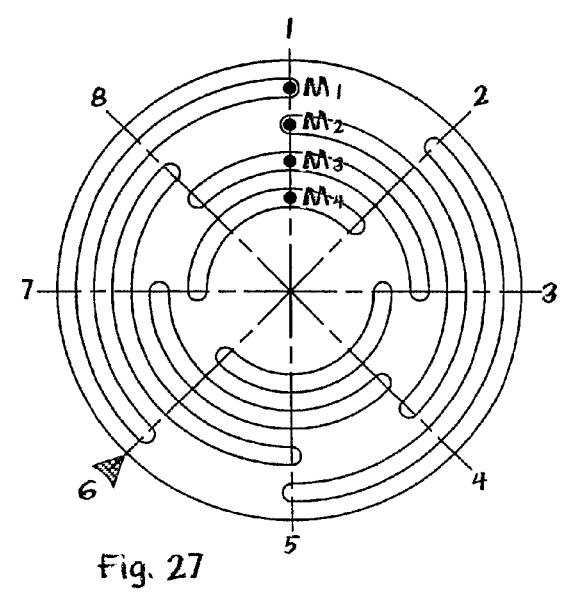

FIG. 15 is a schematic view of the crank arrangement and the stop elements of the blocking means according to FIGS. 8 through 14 in the fourth relative switching position with the transmission in position "P" and with the actuating element blocked (shift lock) in a view corresponding to FIGS. 8 through 14;

FIG. 16 is a schematic view of the crank arrangement and the stop elements of the blocking means according to FIGS. 8 through 15 in the third relative switching position with the transmission in position "N" and with the actuating element blocked (shift lock) in a view corresponding to FIGS. 8 through 15;

FIG. 17 is a schematic view of the crank arrangement and the stop elements of the blocking means according to FIGS. 8 through 16 in the fourth relative switching position with the transmission in position "N" and with the actuating element blocked (shift lock) in a view corresponding to FIGS. 8 through 16;

FIG. 18 is a schematic view of the crank arrangement and the stop elements of the blocking means according to FIGS. 8 through 17 in a fifth relative switching position with the transmission in position "N" and with the actuating element blocked (shift lock) in a view corresponding to FIGS. 8 through 17;

FIG. 19 is a schematic view of the crank arrangement and the stop elements of the blocking means according to FIGS. 8 through 18 in a sixth relative switching position with the transmission in position "N" and with the actuating element blocked (shift lock) in a view corresponding to FIGS. 8 through 18;

FIG. 20 is a schematic view of the crank arrangement and the stop elements of the blocking means according to FIGS. 8 through 19 in the fourth relative switching position with the transmission in position "D" and with the reverse gear blocked in a view corresponding to FIGS. 8 through 19;

FIG. 21 is a schematic view of the crank arrangement and the stop elements of the blocking means according to FIGS. 8 through 20 in the fifth relative switching position with the transmission in position "D" and with the reverse gear blocked in a view corresponding to FIGS. 8 through 20;

FIG. 22 is a schematic view of the crank arrangement and the stop elements of the blocking means according to FIGS. 8 through 21 in the sixth relative switching position with the transmission in position "D" and with the reverse gear blocked in a view corresponding to FIGS. 8 through 21;

FIG. 23 is a schematic view of the crank arrangement and the stop elements of the blocking means according to FIGS. 8 through 22 in a seventh relative switching position with the transmission in position "D" and with the reverse gear blocked in a view corresponding to FIGS. 8 through 22;

FIG. 24 is a schematic view of the crank arrangement and the stop elements of the blocking means according to FIGS. 8 through 23 in the third relative switching position in the blocked state and in the absence of auxiliary energy in a view corresponding to FIGS. 8 through 23;

FIG. 25 is a schematic view of the crank arrangement and the stop elements of the blocking means according to FIGS. 8 through 24 in the fourth relative switching position in the blocked state and in the absence of auxiliary energy in a view corresponding to FIGS. 8 through 24;

FIG. 26 is a schematic view of the crank arrangement and the stop elements of the blocking means according to FIGS. 8 through 25 in the fifth relative switching position in the blocked state and in the absence of auxiliary energy in a view corresponding to FIGS. 8 through 25;

FIG. 27 is a schematic view of the crank arrangement and the stop elements of the blocking means according to FIGS. 8 through 26 in the sixth relative switching position in the blocked state and in the absence of the auxiliary energy in a view corresponding to FIGS. 8 through 26.

Figure 28:
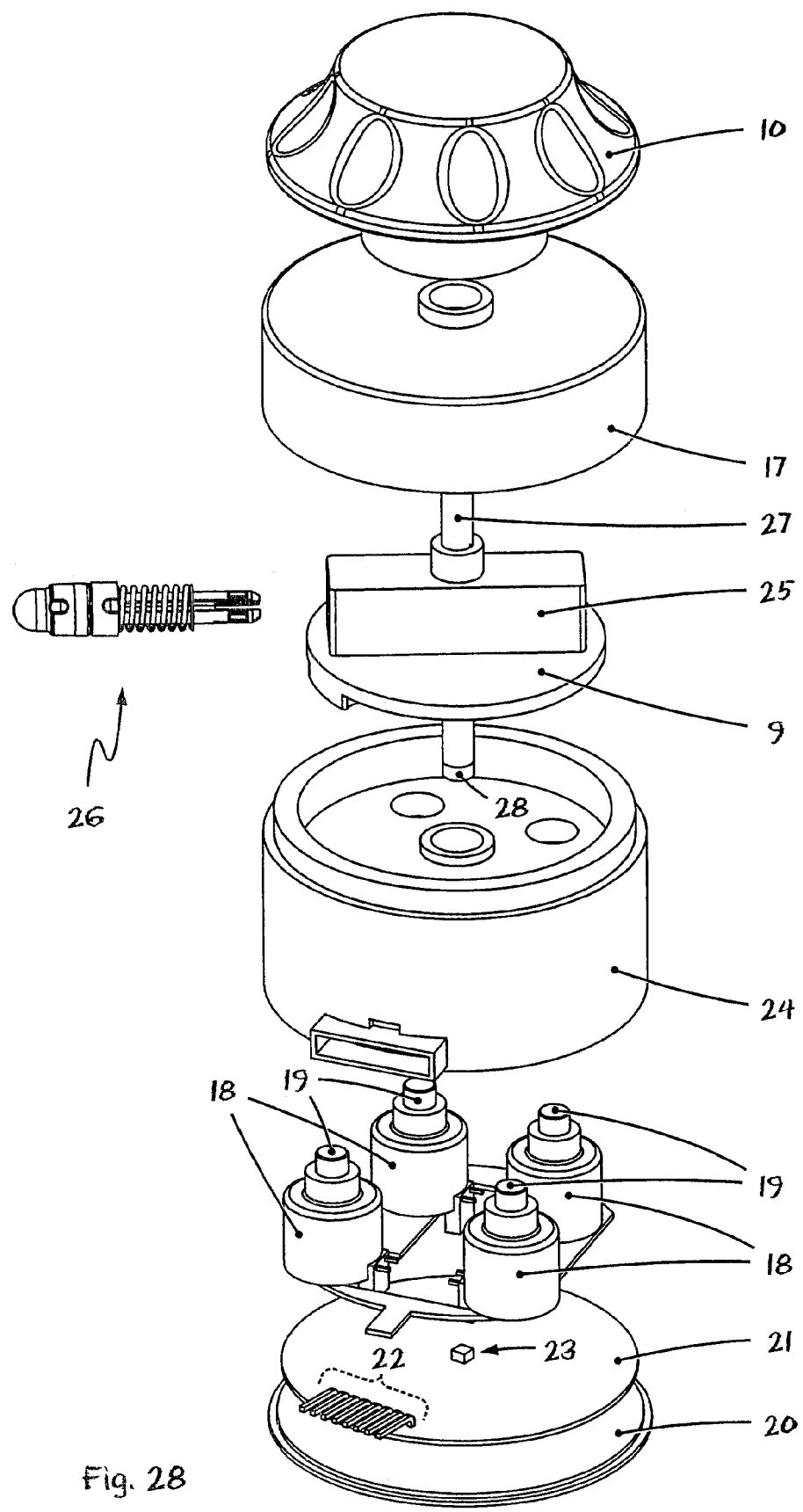
Figure 29:
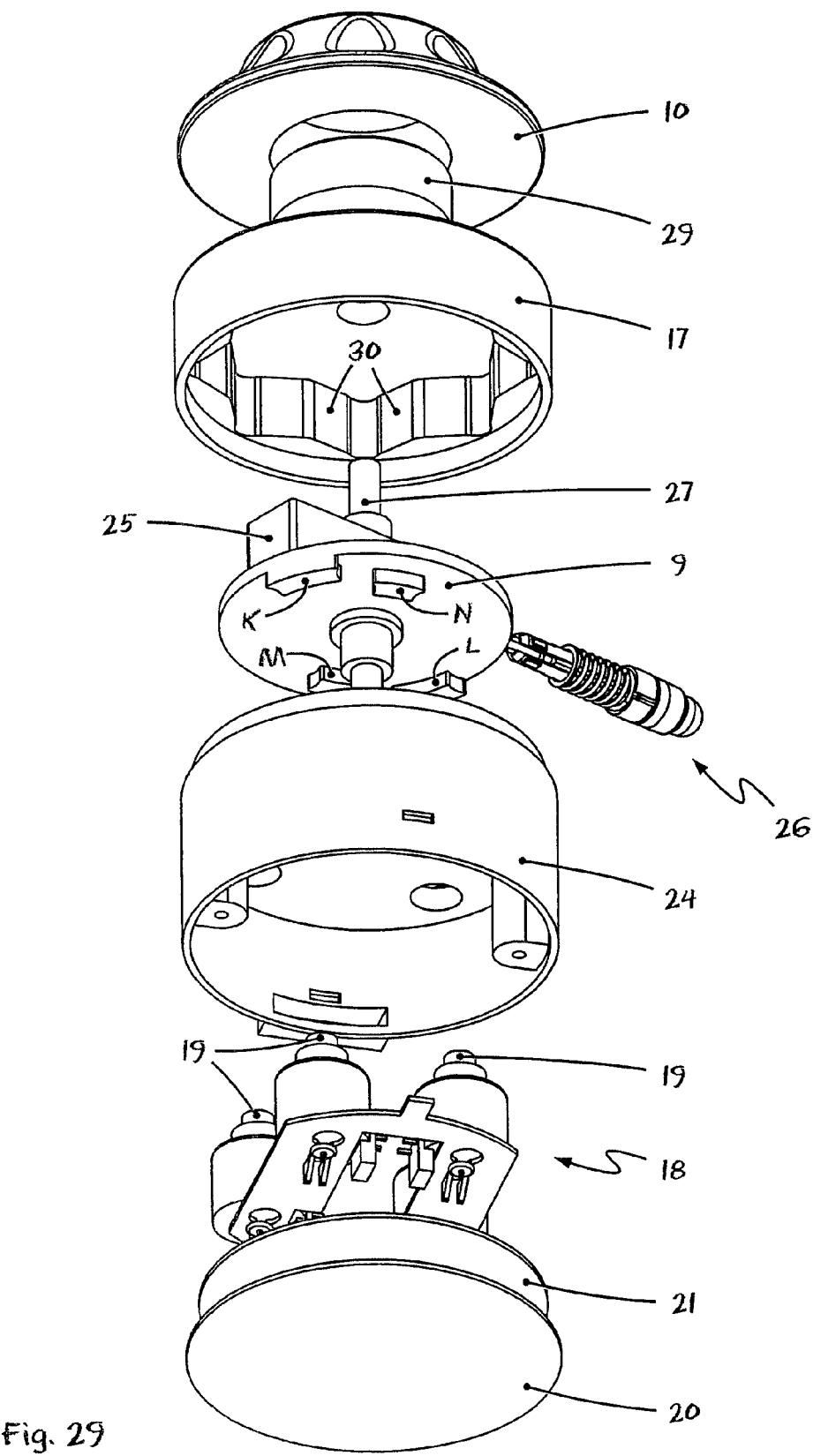
Figure 30:
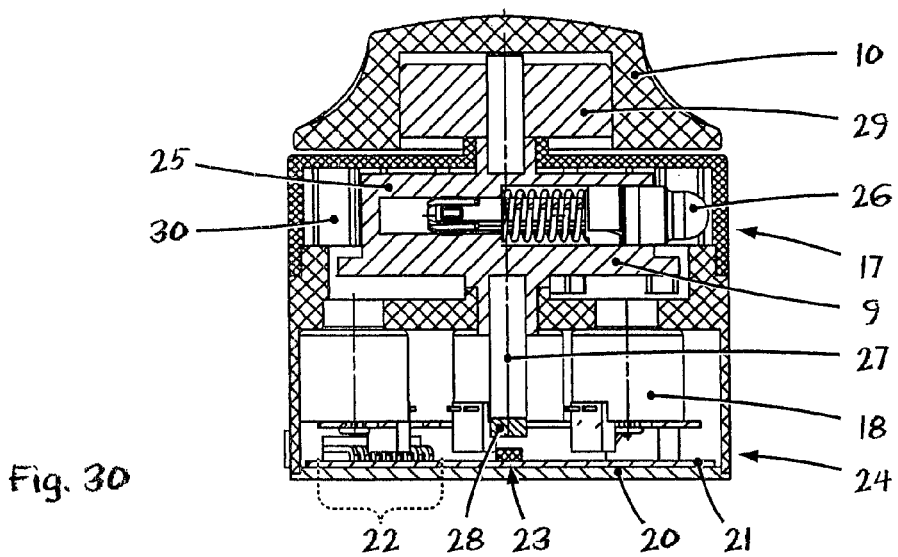
Figure 31:
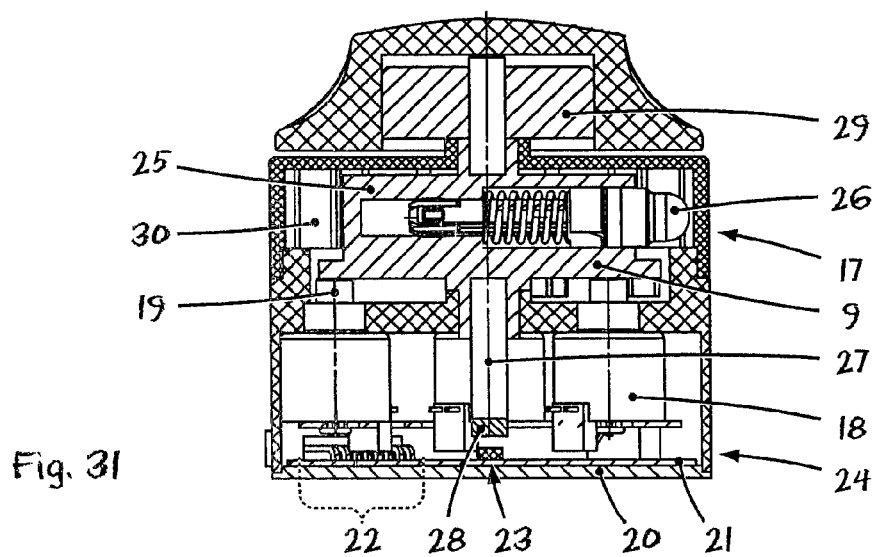
Figure 32:
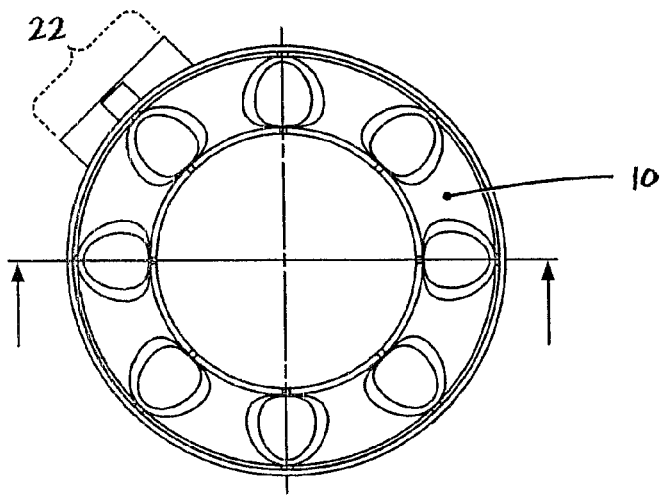
Figure 33:
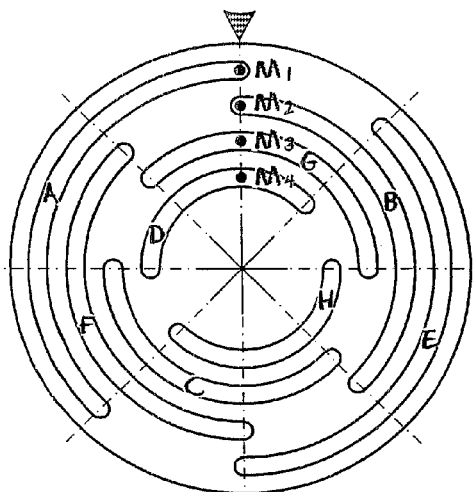
Figure 34:
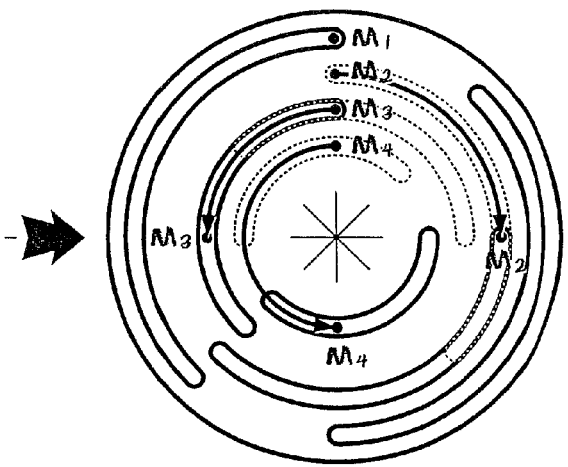
Figure 35:
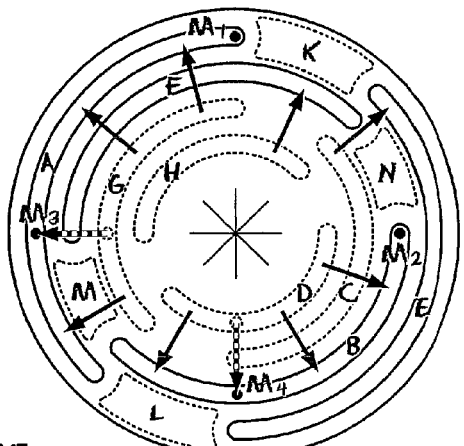
Figure 36:
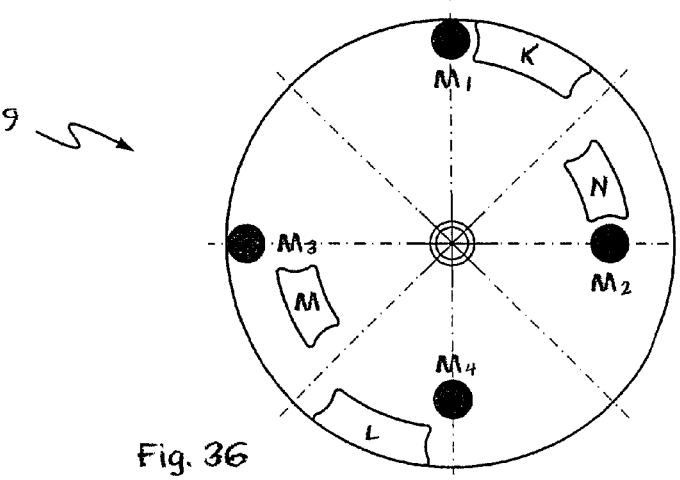
Figure 37:
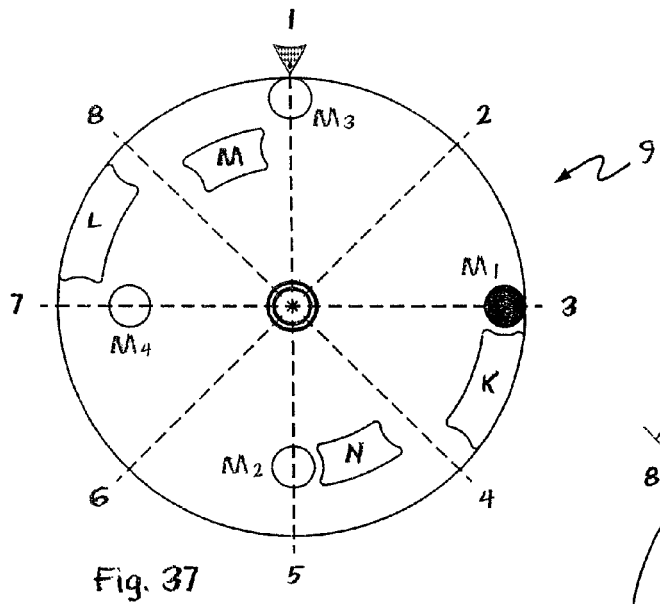
Figure 38:
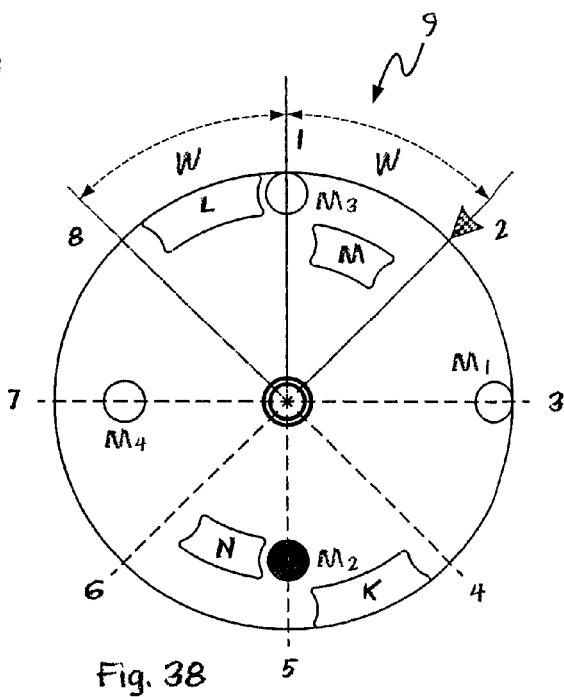
Figure 39:
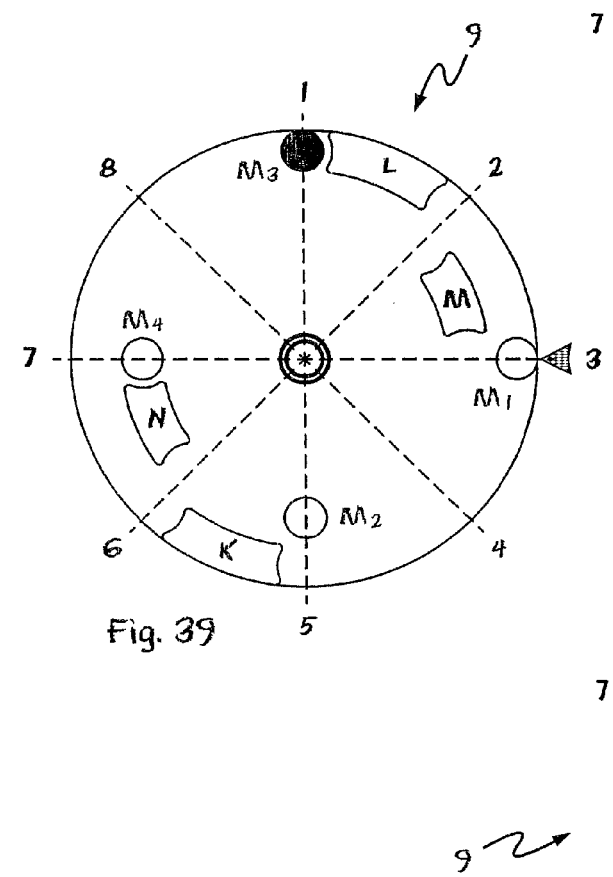
Figure 40:
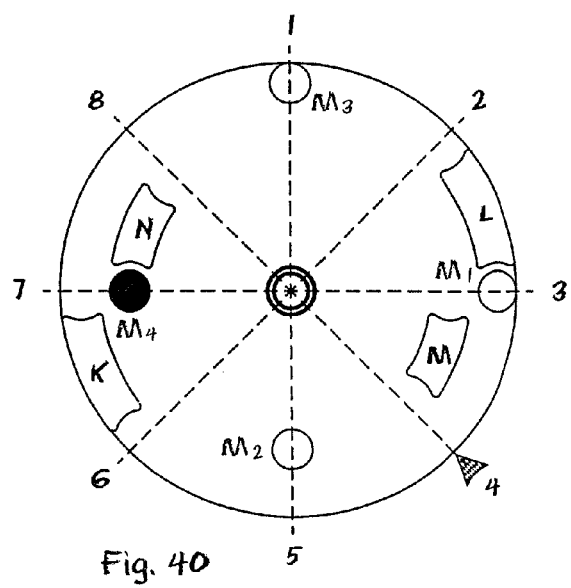
Figure 41:
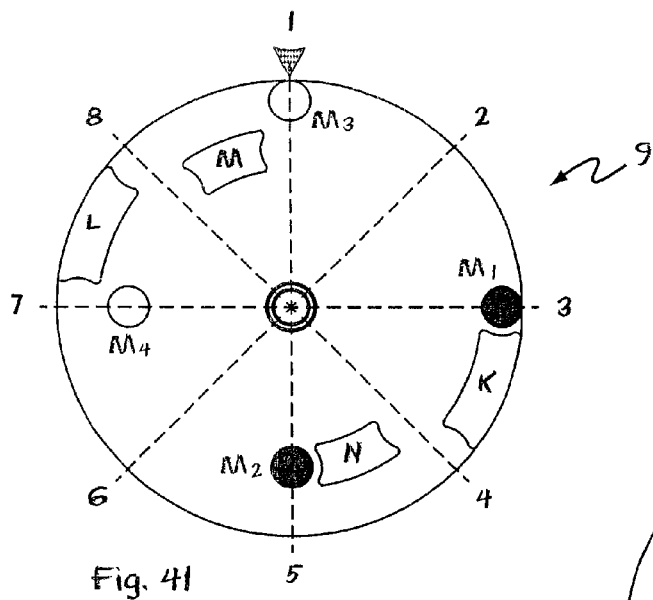
Figure 42:
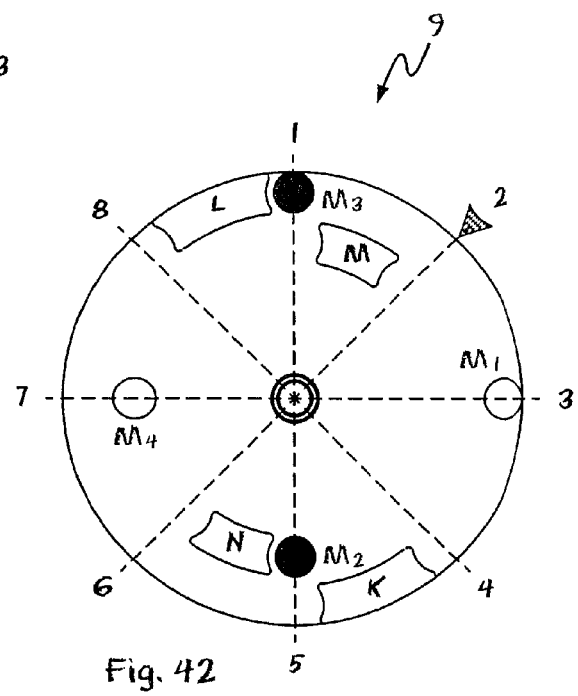
Figure 43:
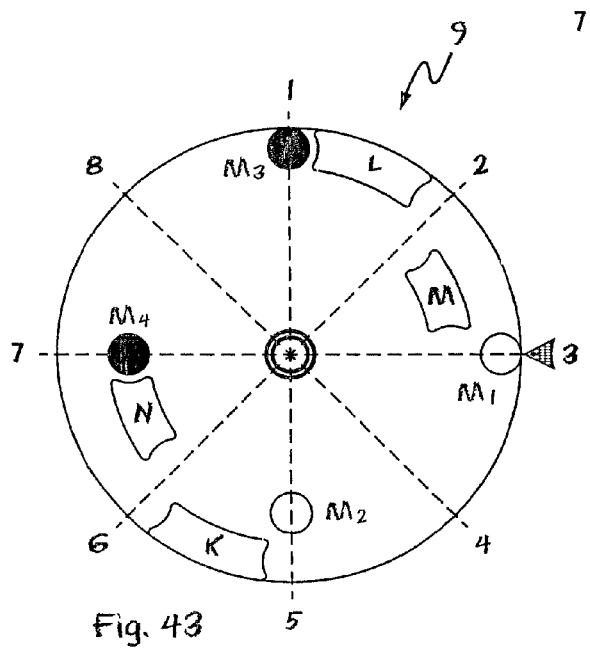
Figure 44:
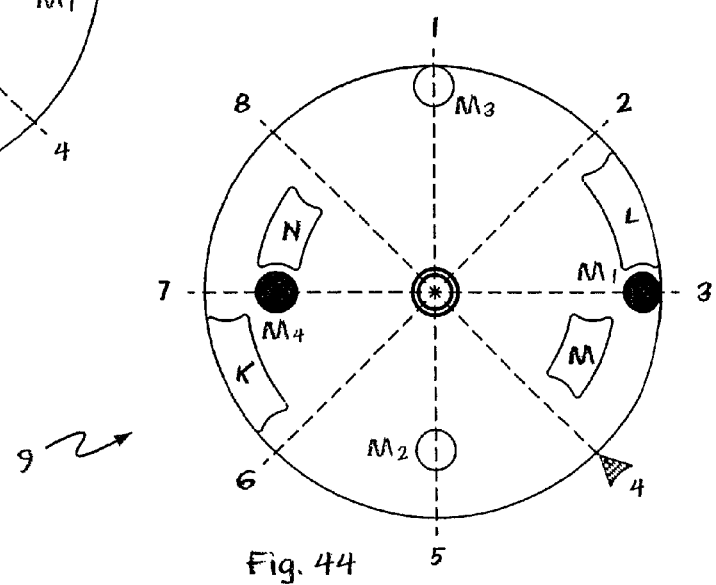
Figure 45:
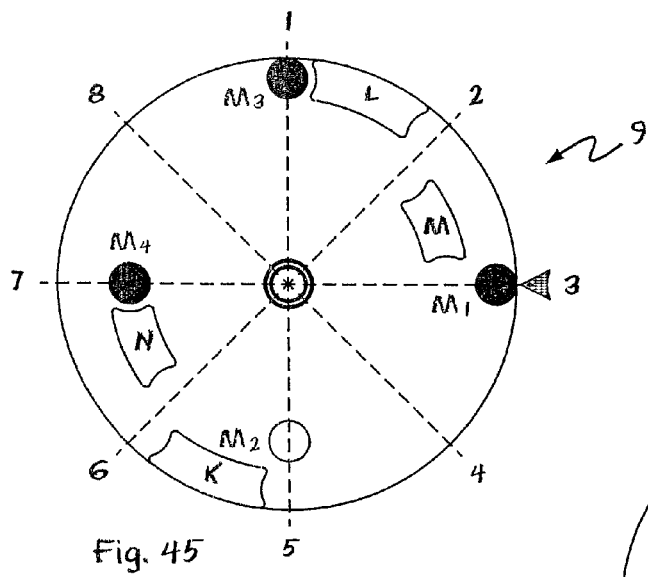
Figure 46:
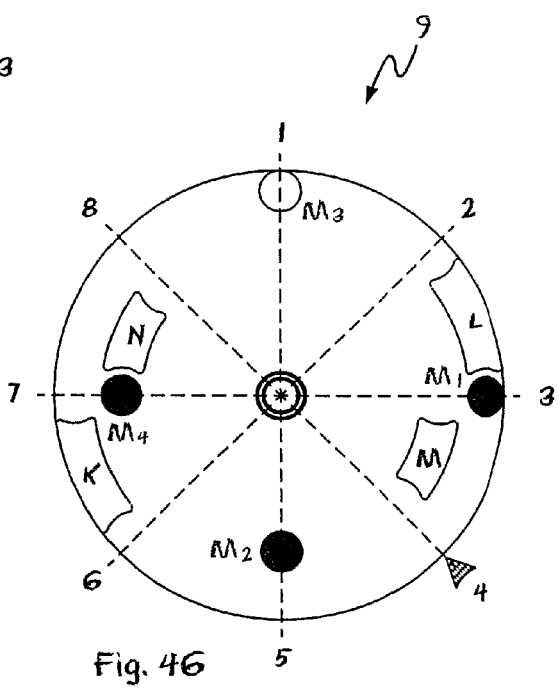
Figure 47:
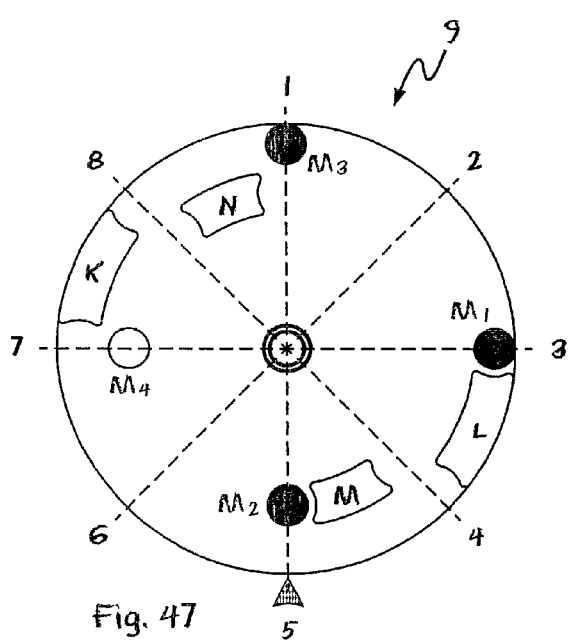
Figure 48:
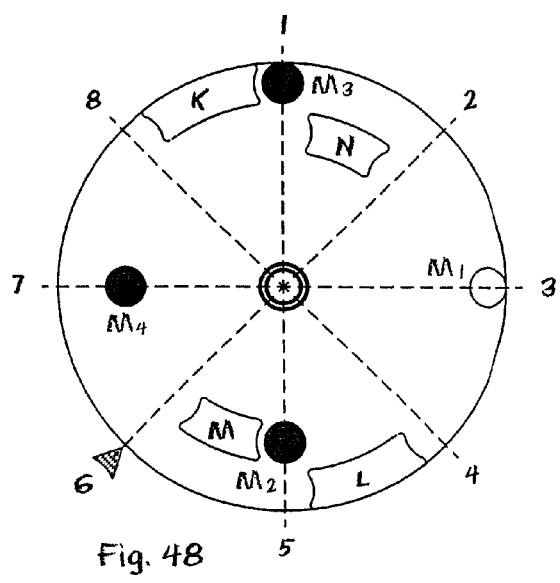
Figure 49:
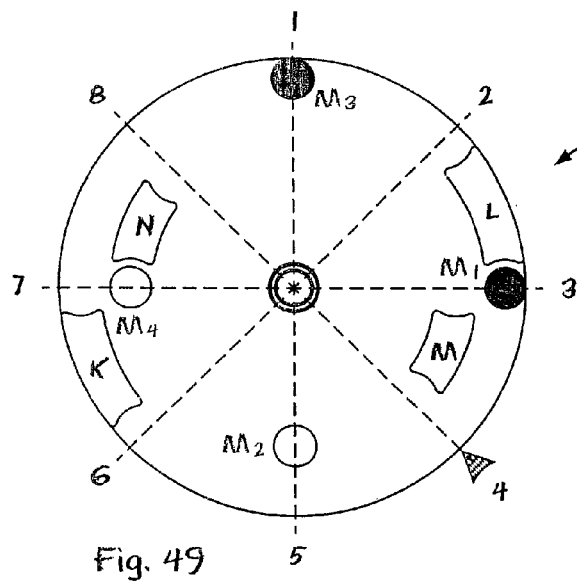
Figure 50:
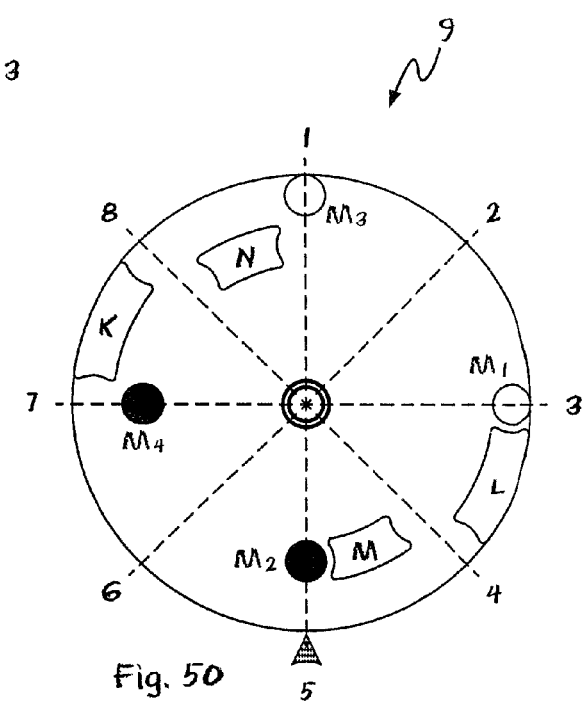
Figure 51:
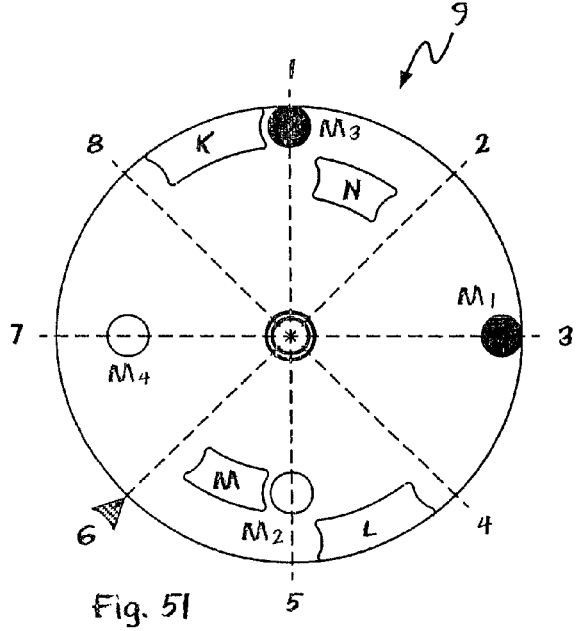
Figure 52:
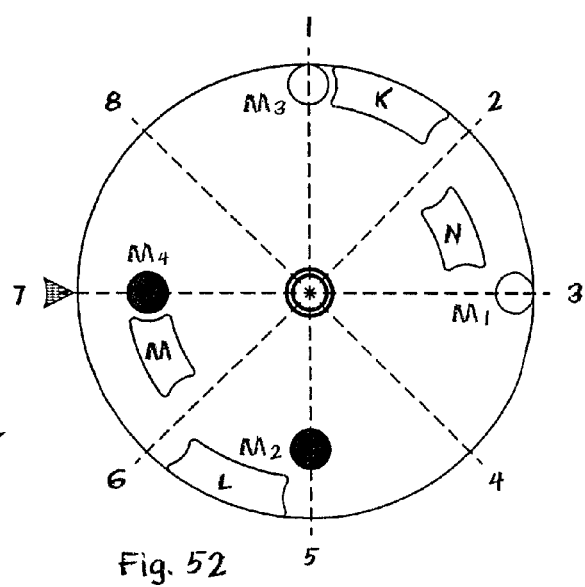
Figure 53:
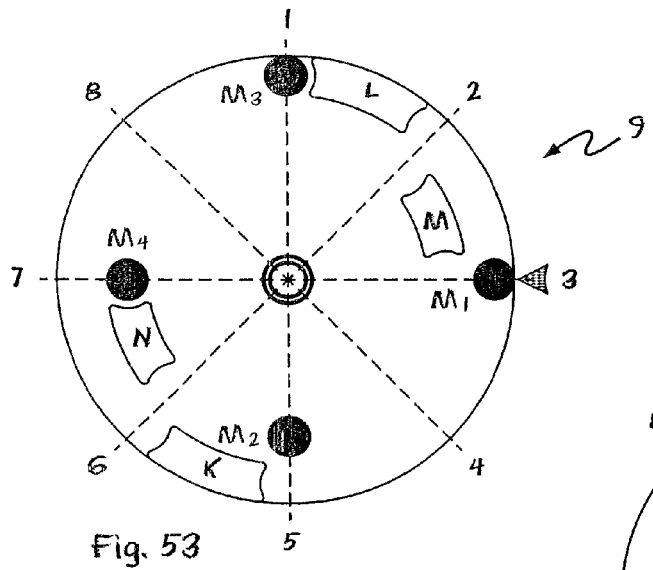
Figure 54:
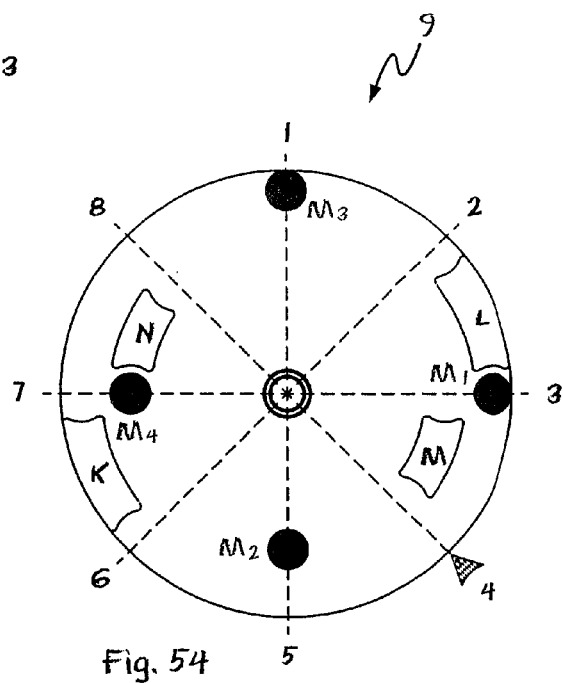
Figure 55:
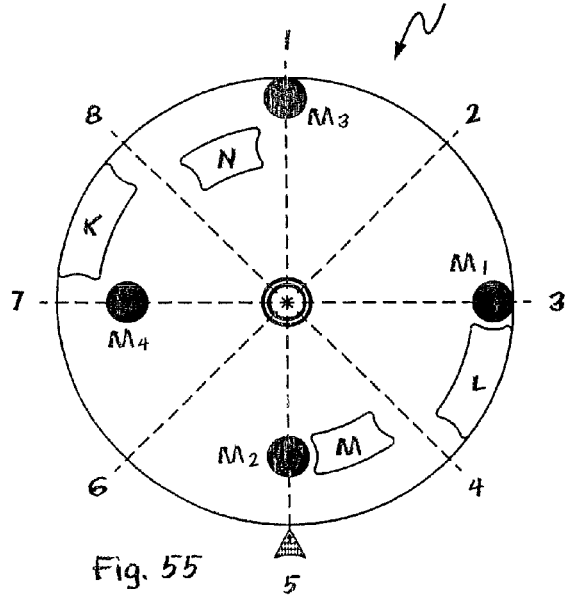
Figure 56:
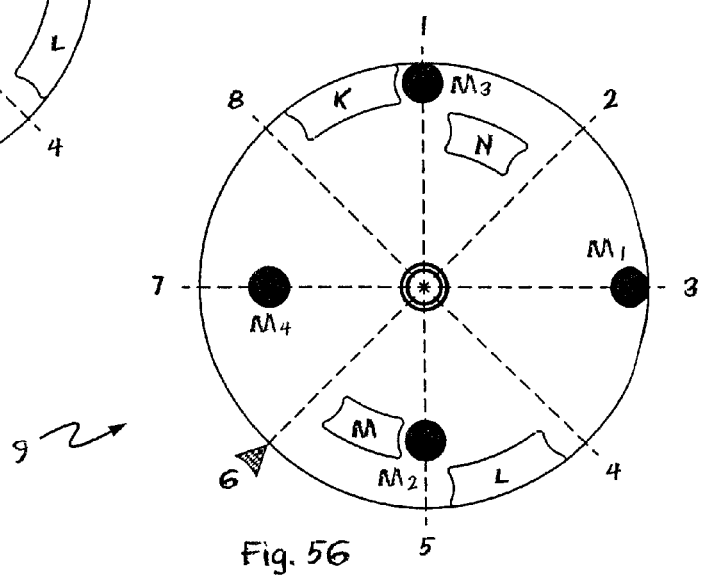

FIG. 28 is an upper isometric exploded view of another embodiment of an actuating device for an automatic transmission;

FIG. 29 is a lower isometric exploded view of the actuating device according to FIG. 28 in a view similar to FIG. 28;

FIG. 30 is a longitudinal sectional schematic view of the actuating device according to FIGS. 28 and 29 with deactivated stop elements;

FIG. 31 is the longitudinal sectional view of the actuating device according to FIGS. 28 through 30 with activated stop elements in a view corresponding to FIG. 30;

FIG. 32 is a schematic top view of the actuating device according to FIGS. 28 through 31 with view of the section plane according to FIGS. 30 and 31;

FIG. 33 is a schematic view of the crank arrangement and the stop elements of the blocking means according to FIGS. 8 through 25 in a view corresponding to FIGS. 8 through 25;

FIG. 34 is a schematic view showing a first transfer step from the embodiment according to FIG. 33 to the embodiment according to FIG. 36 in a view corresponding to FIG. 33;

FIG. 35 is a schematic view showing another transfer step from the embodiment according to FIG. 33 to the embodiment according to FIG. 36 in a view corresponding to FIGS. 33 and 34;

FIG. 36 is a schematic view showing the crank arrangement and the stop elements of the blocking means for the actuating device according to FIGS. 28 through 32 in a view corresponding to FIGS. 33 through 35;

FIG. 37 is a schematic view showing the crank arrangement and the stop elements of the blocking means according to FIGS. 28 through 32 in a first relative switching position with the transmission in position "P" in a view corresponding to FIG. 36;

FIG. 38 is a schematic view showing the crank and the stop elements of the blocking means according to FIGS. 28 through 32 in a second relative switching position with the transmission in position "P" in a view corresponding to FIG. 37;

FIG. 39 is a schematic view showing the crank arrangement and the stop elements of the blocking means according to FIGS. 28 through 32 in a third relative switching position with the transmission in position "P" in a view corresponding to FIGS. 37 and 38;

FIG. 40 is a schematic view showing the crank arrangement and the stop elements of the blocking means according to FIGS. 28 through 32 in a fourth relative switching position with the transmission in position "P" in a view corresponding to FIGS. 37 through 39;

FIG. 41 is a schematic view showing the crank arrangement and the stop elements of the blocking means according to FIGS. 28 through 32 in the first relative switching position with the transmission in position "P" and with the actuating element blocked (shift lock) in a view corresponding to FIGS. 37 through 40;

FIG. 42 is a schematic view showing the crank arrangement and the stop elements of the blocking means according to FIGS. 28 through 32 in the second relative stop element with the transmission in position "P" and with the actuating element blocked (shift lock) in a view corresponding to FIGS. 37 through 41;

FIG. 43 is a schematic view showing the crank arrangement and the stop elements of the blocking means according to FIGS. 28 through 32 in the third relative switching position with the transmission in position "P" and with the actuating element blocked (shift lock) in a view corresponding to FIGS. 37 through 42;

FIG. 44 is a schematic view showing the crank arrangement and the stop elements of the blocking means according to FIGS. 28 through 32 in the fourth relative switching position with the transmission in position "P" and with the actuating element blocked (shift lock) in a view corresponding to FIGS. 37 through 43;

FIG. 45 is a schematic view showing the crank arrangement and the stop elements of the blocking means according to FIGS. 28 through 32 in the third relative switching position with the transmission in position "N" and with the actuating element blocked (shift lock) in a view corresponding to FIGS. 37 through 44;

FIG. 46 is a schematic view showing the crank arrangement and the stop elements of the blocking means according to FIGS. 28 through 32 in the fourth relative switching position with the transmission in position "N" and with the actuating element blocked (shift lock) in a view corresponding to FIGS. 37 through 45;

FIG. 47 is a schematic view showing the crank arrangement and the stop elements of the blocking means according to FIGS. 28 through 32 in a fifth relative switching position with the transmission in position "N" and with the actuating element blocked (shift lock) in a view corresponding to FIGS. 37 through 46;

FIG. 48 is a schematic view showing the crank arrangement and the stop elements of the blocking means according to FIGS. 28 through 32 in a sixth relative switching position with the transmission in position "N" and with the actuating element blocked (shift lock) in a view corresponding to FIGS. 37 through 47;

FIG. 49 is a schematic view showing the crank arrangement and the stop elements of the blocking means according to FIGS. 28 through 32 in the fourth relative switching position with the transmission in position "D" and with the reverse gear blocked in a view corresponding to FIGS. 37 through 48;

FIG. 50 is a schematic view showing the crank arrangement and the stop elements of the blocking means according to FIGS. 28 through 32 in the fifth relative switching position with the transmission in position "D" and with the reverse gear blocked in a view corresponding to FIGS. 37 through 49;

FIG. 51 is a schematic view showing the crank arrangement and the stop elements of the blocking means according to FIGS. 28 through 32 in the sixth relative switching position with the transmission in position "D" and with the reverse gear blocked in a view corresponding to FIGS. 37 through 50;

FIG. 52 is a schematic view showing the crank arrangement and the stop elements of the blocking means according to FIGS. 28 through 32 in a seventh relative switching position with the transmission in position "D" and with the reverse gear blocked in a view corresponding to FIGS. 37 through 51;

FIG. 53 is a schematic view showing the crank arrangement and the stop elements of the blocking means according to FIGS. 28 through 32 in the third relative switching position in the blocked state and in the absence of the auxiliary energy in a view corresponding to FIGS. 37 through 52;

FIG. 54 is a schematic view showing the crank arrangement and the stop elements of the blocking means according to FIGS. 28 through 32 in the fourth relative switching position in the blocked state and in the absence of the auxiliary energy in a view corresponding to FIGS. 37 through 53;

FIG. 55 is a schematic view showing the crank arrangement and the stop elements of the blocking means according to FIGS. 28 through 32 in the fifth relative switching position in the blocked state and in the absence of the auxiliary energy in a view corresponding to FIGS. 37 through 54; and FIG. 56 is a schematic view showing the crank arrangement and the stop elements of the blocking means according to FIGS. 28 through 32 in the sixth relative switching position in the blocked state and in the absence of the auxiliary energy in a view corresponding to FIGS. 37 through 55.

DESCRIPTION OF THE PREFERRED EMBODIMENTS

Referring to the drawings in particular, FIGS. 1 through 6 show schematic views of the crank arrangement 9 and the stop elements M1, M2 (FIGS. 1, 3 and 5) of the blocking means as well as the corresponding actuating element 10 with the display means 11 (FIGS. 2, 4 and 6) of a first embodiment of an actuating device ac cording to the present invention in different switching positions.

Figure 2:
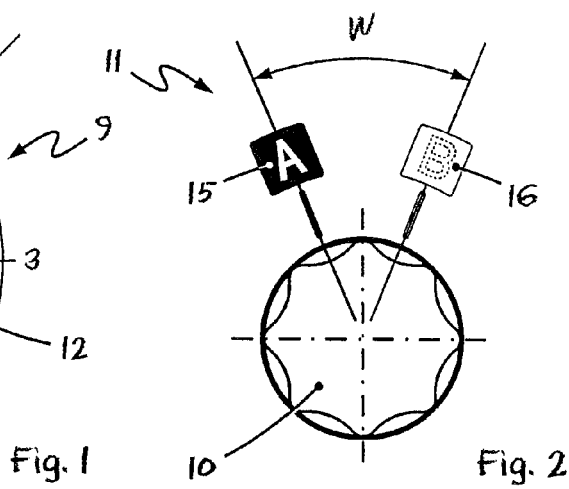
FIG. 2 is a schematic view of the actuating element and the display means of the actuating device according to FIG. 1.
Figure 4:
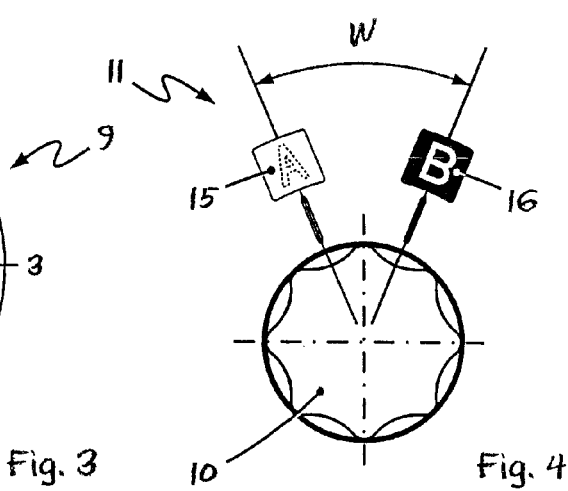
FIG. 4 is a schematic view of the actuating element and the display means of the actuating device according to FIG. 1 in a view corresponding to FIG. 2.
Figure 6:
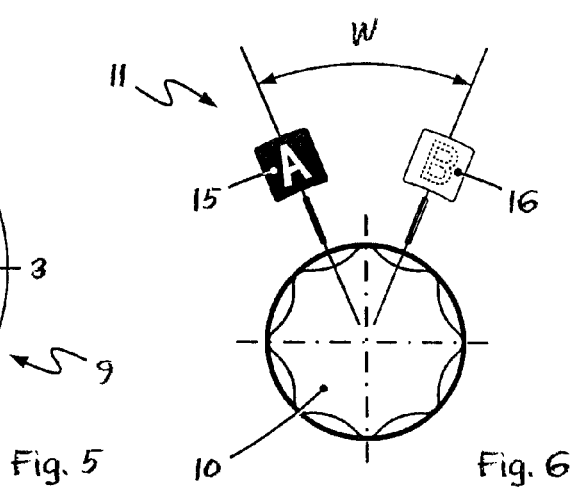
FIG. 6 is a schematic view of the actuating element and the display means of the actuating device according to FIGS. 1 through 5 in a view corresponding to FIGS. 2 and 4.

The actuating element, which is used to control a technical system, not shown, and is designed as a rotationally symmetrical rotary switch with recessed grips, is at first recognized on the basis of the view of the actuating element 10 in FIGS. 2, 4 and 6. It is again assumed here for the sake of simple illustration only that the rotary switch 10 being shown shall be used to turn on and off a windshield wiper.

Figure 1:
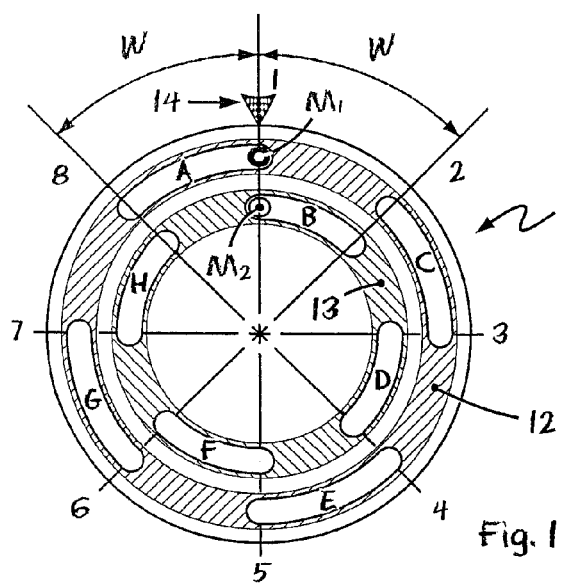
FIG. 1 is a schematic view of a crank arrangement and stop elements of a first embodiment of an actuating device in a first relative switching position.
Figure 3:
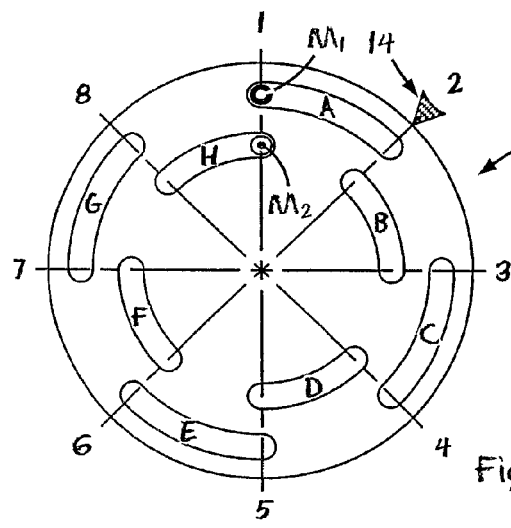
FIG. 3 is a schematic view of the crank arrangement and the stop elements of the actuating device according to FIGS. 1 and 2 in the second relative switching position in a view corresponding to FIG. 1.
Figure 5:
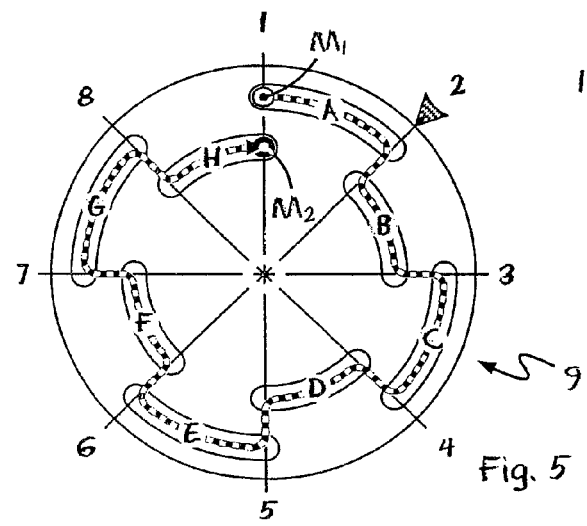
FIG. 5 is a schematic view of the crank arrangement and the stop elements of the actuating device according to FIGS. 1 through 4 in the second relative switching position as well as with view of the total crank angle in a view corresponding to FIGS. 1 and 3.

The rotary switch 10 is located here on the axis of rotation as the crank disk 9 shown in FIGS. 1, 3 and 5 and is connected thereto in such a way that they rotate in unison. The two stop bolts M1, M2 according to FIGS. 1, 3 and 5 and their electromagnetic drives are connected, by contrast, to a housing of the actuating device, which said housing is not shown here. The crank disk 9 comprises a crank arrangement 9 comprising eight crank segments A through H, wherein the eight crank segments A through H are arranged distributed between two crank areas 12, 13. An annular surface area—shown with a shaded background in FIG. 1—on the crank disk 9 is assigned to each of the two crank areas 12, 13. Thus, both the crank segments A, C, E and G and the stop bolt M1 are thus assigned to the (outer) crank area 12, while the crank segments B, D, F and H and the stop bolt M2 are assigned to the (inner) crank area 13.

The arrow symbol 14 arranged on the outer circumference of the crank disk 9 in FIGS. 1, 3 and 5 as well as in FIGS. 8 through 27 and 37 through 56 is not an element of the actuating device but is used only for the identification and easier detection of the particular angular position of the crank disk 9 in the different switching positions.

The principle of operation of the actuating device according to the present invention shall be explained below in the basis of FIGS. 1 through 6.

In the state according to FIGS. 1 and 2, the system to be controlled, i.e., the windshield wiper motor in the case of the example, is turned off. It is recognized in FIG. 1 that the stop bolt M1 is activated and extended at right angles to the drawing plane (symbolized by the black solid view of the stop bolt M1), i.e., the stop bolt M1 thus engages the crank segment A. The second stop bolt M2 is, by contrast, deactivated or retracted at right angles to the drawing plane in the view according to FIG. 1 and therefore it does not engage the corresponding crank segment B.

In other words, this means that the crank disk 9 and the stop bolt M1 according to the view in FIG. 1 interact such that the crank disk 9 and hence also the rotary switch 10 are located instantaneously at the left stop because of the activated stop bolt M1 and can thus be turned back clockwise to the right by the amount of the switching angle W only. By turning the rotary switch 10 and the crank disk 9 connected thereto to the right by the amount of the switching angle W, the view according to FIGS. 3 and 4 is obtained.

According to FIGS. 1 and 2, the rotary switch 10 is located mechanically at its left stop, i.e., corresponding to the "Off" position of the windshield washer motor in this case, based on the crank disk 9 connected to the rotary switch 10 as well as based on the activated stop bolt M1. The windshield washer shall now be turned on by the operator or driver manually. The windshield washer is turned on manually by rotating the rotary switch 10 to the right until the left end of the crank segment A comes into contact with the stop bolt M1, cf. FIG. 3. The motion of the rotary switch 10 is recorded now by a suitable sensor system. The electronic control unit then turns on the windshield washer motor.

However, if, for example, the driver turns off the engine and the ignition and leaves the vehicle, the windshield washer is also stopped hereby. To prevent the unexpected and usually undesired restart of the windshield washer when travel is later continued or at the next start of the vehicle, the electronic control unit resets, however, the switching state of the windshield washer into the Off position, for example, when the vehicle is left and locked.

However, this means that the operating state of the windshield washer now no longer agrees with the switching state of the rotary switch 10. The rotary switch 10 is rather in the mechanical "On" position at the right stop according to FIGS. 3 and 4 as before. In the case of a conventional actuating device with discrete switching positions, the driver thus could not turn on the windshield washer again, which was automatically stopped meanwhile, as usual by turning the rotary switch 10 to the right, because the rotary switch 10 would continue to be at the right stop and consequently already in the mechanical "On" position.

This problem is solved in the actuating device being shown by the electronic control unit transposing the states of activation of the stop bolts M1 and M2 simultaneously with the automatic turning off of the windshield washer at the latest at the beginning of continued travel, without, however, the absolute position of the rotary switch 10 having changed. The picture shown in FIGS. 5 and 6 is thus obtained. Neither the position of the rotary switch 10 nor the angular position of the crank disk 9 has been changed in the process. Only the stop bolt M1 was deactivated or retracted, while the stop bolt M2 was activated or extended at the same time.

Without having changed their angular positions, the crank disk 9 and the rotary switch 10 are now consequently again at their mechanically correct left stop (see crank segment H according to FIG. 5) and thus also agree again with the state of the system, which was automatically changed by the electronic control unit (namely, with the automatically set Off position of the windshield washer). Despite the fact that the windshield washer was turned off automatically and despite the unchanged absolute position of the rotary switch 10, the intuitively clear situation "windshield washer is off, turn on, as always, by turning the knob to the right" will arise for the driver.

According to the view in FIGS. 2, 4 and 6, the actuating device being shown comprises, moreover, a means 11 for displaying the particular switching state. The display means 11 comprises two discrete display elements 15, 16 in this exemplary embodiment. Thanks to the display means 11, the reliable, intuitive logic and the possibility of easy operation of a classical rotary switch, which is immediately understandable under all conditions, are completely simulated, together with the properties of the actuating device, which were explained above, because, in addition to the stop position of the crank disk 9 or the rotary switch 10, which can be automatically adjusted by means of the electronic control unit, the crank disk 9 and the controllable stop bolts M1 and M2 and can be detected by the operator by touch, the instantaneous switching position of the rotary switch 10 and the actual state of the system being controlled therewith are also signaled visually in an unambiguous manner by the display means 11 with the display elements 15 and 16 arranged discretely in space.

Extrapolated to the example of the actuation of a windshield washer, which was selected for the sake of illustration, this means in reference to FIGS. 2, 4 and 6 that the windshield washer can be turned on and off by intuitively turning the rotary switch 10 to the right or left, and the operating state of the system or of the windshield washer in this case is signaled both by touch by the stop of the respective crank segments A and B at the particular activated stop bolt M1 and M2, respectively, and, moreover, also by the visual display means 11, 15, 16. Thus, according to FIGS. 1 and 2, the windshield washer is at first turned off, the rotary switch 10 and the crank disk 9 are mechanically at the left stop (stop bolt M1 in crank segment A) and the display element 15 is activated, for example, lit by means of a light-emitting diode.

If the windshield washer is now turned off manually, the electronic control unit of the actuating device changes the display at the rotary switch 10 such that the situation according to FIG. 4 is now present. The rotary switch 10 was thus turned to the right by the amount of the switching angle W, and the display element 15 was deactivated and the display element 16 was activated by the control element, the latter display element 16 consequently signaling that the windshield washer is currently in operation.

If the still running windshield washer is later turned off completely automatically, for example, when turning off the ignition, the electronic control unit also transposes the activation of the display elements 15 and 16, besides the states of activation of the stop bolts M1 and M2, in such a way that the display element 15 is again activated after the automatic turning off of the windshield washer, whereby the situation according to FIG. 6 becomes established. However, the actual positions of both the rotary switch 10 and the crank disk 9 remain unchanged during this automatic adaptation of the actuating device to the state of the system, cf. FIG. 3 and FIG. 5.

Moreover, the total crank angle is also visualized in FIG. 5 by means of the bold, dash-dotted line. It is recognized that all crank segments A through H taken together add up to an angle of 360. It becomes possible in this manner that both the left end stop of a crank segment and the right end stop of another crank segment are always occupied by one of the two stop bolts M1, M2 each in each of the total of eight possible relative switching positions 1 through 8 of the rotary switch 10 or relative switching positions of the crank disk 9, which are distributed over 360. This is the prerequisite that each of the here eight possible relative switching positions 1 through 8 of the crank disk 9 can be defined at any time by means of activation of the corresponding stop bolt either as a "rotary switch is at the right stop" or as "rotary switch is at the left stop."

Figure 7:
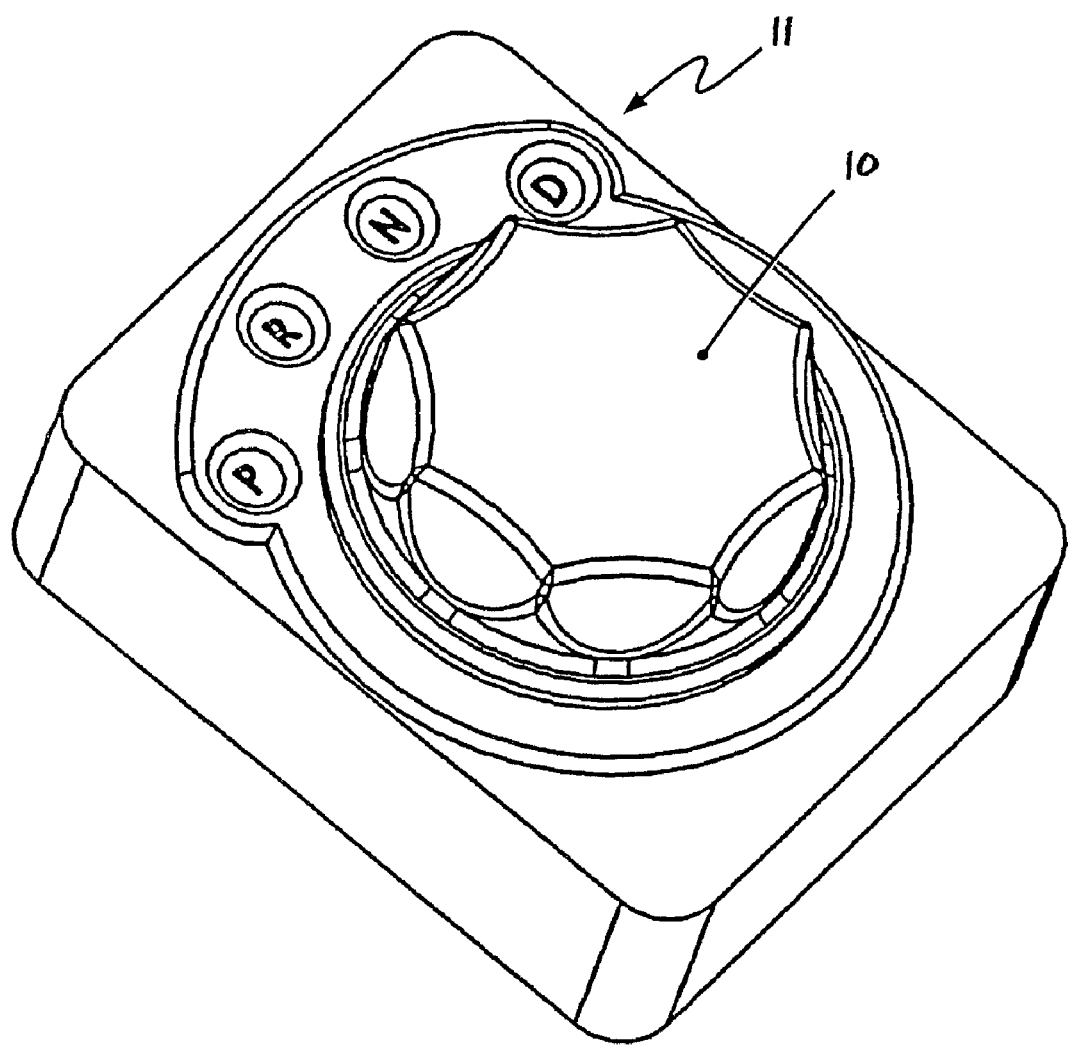
FIG. 7 is a schematic isometric view of an example of an actuating device with display means.

FIG. 7 shows a schematic isometric view of an example of an actuating device with a rotary switch 10 and an assigned display means 11. The actuating device according to FIG. 7 is used especially to control a shift-by-wire-capable gear box, for example, the automatic transmission of a motor vehicle. It is recognized on the basis of the display means 11 that the actuating device according to FIG. 7 has, unlike the actuating device according to FIGS. 1 through 6, not only two switching positions, but four. In reference to use on a motor vehicle transmission, the switching positions of the actuating device according to FIG. 7 are designated in the usual manner by P (parking brake), R (reverse), N (neutral position, idle) and D (drive, forward travel).

Situations in which not only the momentarily engaged gear is changed automatically, but rather even the higher-level shifting state of the transmission itself is changed, namely, situations in which the transmission control device automatically engages, for example, one of the shift positions P, R, N or D, also occur in the motor vehicle transmission, especially in an automatic transmission. For example, there is a possibility that an electronically controlled, shift-by-wire-capable gear box automatically engages position P (parking brake) whenever the ignition key is removed or when the driver leaves the vehicle. For example, the risk of the motor vehicle rolling away in an uncontrolled manner can be prevented with such an automatic parking brake.

However, the actuating element 10 of the vehicle transmission or especially an existing, conventional transmission gearshift lever would continue to be, without any change, in the position selected last by the driver (for example, "Neutral") in such a case, whereas the transmission would in fact be in the automatically engaged "parking brake" position.

Adaptation of both the end stops for the rotary switch 10 by means of changing the state of activation of the stop bolts analogously to the manner described on the basis of FIGS. 1, 3 and 5 and adaptation of the display 11 of the instantaneous, actually engaged gear analogously to the description according to FIGS. 2, 4 and 6 are brought about automatically in such a case by the control device of the transmission or of the actuating device in the case of the actuating device analogous to FIG. 7. Since the rotary switch 10 itself has no shape or color markings, from which the shifting state of the transmission could be inferred, this adaptation of the actuating device can take place without the position of the rotary switch 10 itself having to be changed.

As a result, the rotary switch 10 is mechanically correctly at its left end stop subsequently to the automatic adaptation of the state of activation of the stop bolt by the control device in the case of the example of the automatically engaged parking brake, and the actually occurring shifting state of the transmission is displayed correctly by the lighting up of the left display element "P."

FIGS. 8 through 27 show again, in a schematic view, the crank arrangement 9 as well as the stop bolts M1, M2, M3 and M4 of another embodiment of the blocking means of an actuating device in different switching positions. The actuating element or the rotary switch 10 of the actuating device according to FIGS. 8 through 27 may have, for example, a design similar to that in the view in FIG. 7.

The rotary switch analogous to FIG. 7 is again on the same axis of rotation as that in the crank disk 9 according to FIGS. 8 through 27, and the rotary switch 10 is again connected to the crank disk 9 in such a way that they rotate in unison. The crank disk 9 comprises in this embodiment a crank arrangement comprising again eight crank segments A through H, wherein the eight crank segments A through H are, however, arranged this time distributed among four different crank areas (comprising two crank segments each). Each of the four crank areas is arranged on a separate surface area on the crank disk 9. The blocking means comprises, furthermore, four stop bolts M1, M2, M3 and M4, a stop bolt M1 through M4 being assigned to each of the crank areas.

The blocking means according to FIGS. 8 through 27 belongs to an actuating device, which can assume, analogously to the actuating device shown in FIG. 7, four switching positions. This means that a separate crank area each as well as a separate stop bolt M1 through M4 each are assigned to each of the four switching positions (for example, P, R, N and D of an automatic transmission).

Figure 8:
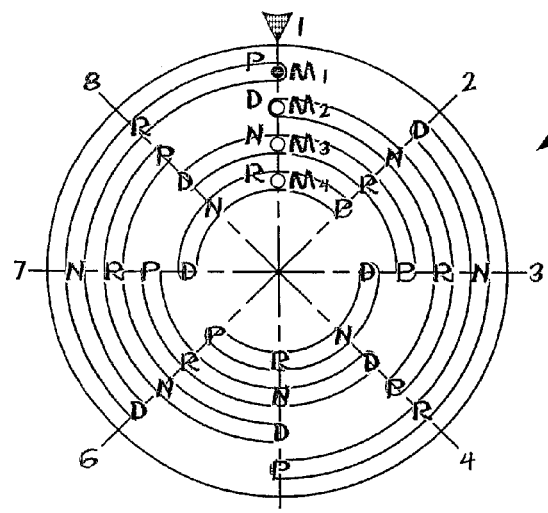
FIG. 8 is a schematic view of the crank arrangement and the stop elements of an embodiment of the blocking means of an actuating device for an automatic transmission in a first relative switching position with the transmission in position "P", the schematic view corresponding to FIGS. 1, 3 and 5.

It is recognized from FIGS. 8 through 11, but especially on the basis of the symbols added for the gears P, R, N and D in FIG. 8, that the crank segments are arranged distributed in such a way that the four stop bolts M1, M2, M3 and M4 taken together always occupy all four relative positions, which correspond to the gears P, R, N and D in the embodiment being shown, for each of the eight possible relative switching positions 1 through 8 of the crank disk 9.

Figure 9:
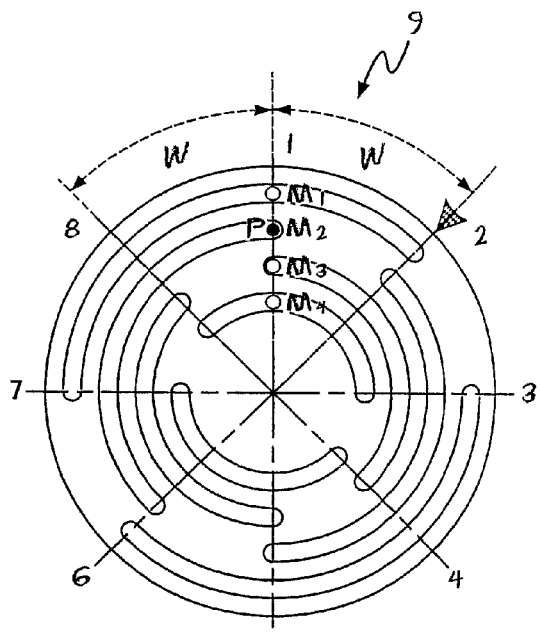
FIG. 9 is a schematic view of the crank arrangement and the stop elements of the blocking means according to FIG. 8 in a second relative switching position with the transmission in position "P", the view corresponding to FIG. 8.

In other words, there always is exactly one stop bolt M1, M2, M3 or M4, which has the corresponding relative position belonging to that gear within its crank segment, for each of the possible relative switching positions 1 through 8, of which there are eight here as a consequence of the switching angle W=45, see FIG. 9. As a result, the particular gear among the gears P, R, N or D that shall correspond to the current position of the rotary switch can be (re)defined at any time for each of the eight possible relative switching positions 1 through 8 of the crank disk 9 and hence also for each possible relative switching position of the rotary switch 10 according to FIG. 7 merely by activating the corresponding stop bolt.

Figure 11:
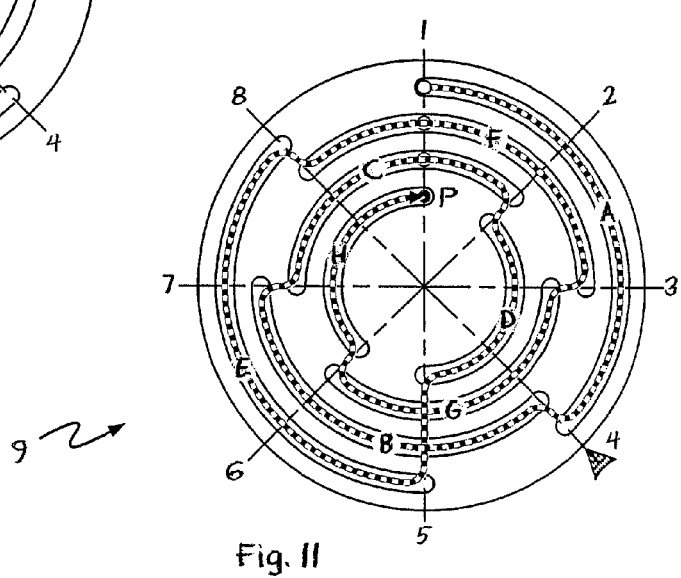
FIG. 11 is a schematic view of the crank arrangement and the stop elements of the blocking means according to FIGS. 8 through 10 in a fourth relative switching position as well as with view of the total crank angle with the transmission in position "P" in a view corresponding to FIGS. 8 through 10.

It is recognized from FIG. 8 that the stop bolt M1 is activated or extended at right angles to the drawing plane (symbolized by the solid filled-in view of the stop bolt M1), i.e., the stop bolt M1 thus engages crank segment A (for the designation of the crank segments A through H, see FIG. 11). The other stop bolts M2, M3 and M4 are, by contrast, deactivated or retracted at right angles to the drawing plane in the view according to FIG. 8 and therefore they do not engage the corresponding crank segment B.

In other words, this means that the crank disk 9 and the stop bolt M1 according to the view in FIG. 1 interact such that the crank disk 9 and consequently also the rotary switch 10 are instantaneously at the left stop because of the activated stop bolt M1 and thereby can be turned only clockwise to the right. By turning the rotary switch 10 and the crank disk 9 connected thereto by the amount of the switching angle W, the view according to FIG. 9 will then be obtained.

The situation shown in FIGS. 8 through 11 corresponds to the engaged gear P (parking brake). This situation occurs on the actuating device especially at the time of the so-called restart of the actuating device. The "restart" situation corresponds primarily to the system state of the vehicle transmission and the actuating device at the start of travel or when the ignition of the motor vehicle is turned on. Before, when the ignition was still turned off, the vehicle transmission was in the gear P concerning the situation shown in FIGS. 8 through 11, whether selected manually or automatically, and it also maintains at first this gear P when the ignition is turned on.

The electronic control unit of the actuating device then determines the relative switching position of the rotary switch 10 or the crank disk 9 at the time of the restart. The crank disk 9 can be, in fact, only in one of the four positions shown in FIGS. 8 through 11, because the four relative switching positions 5, 6, 7 and 8 not shown in FIGS. 8 through 11 are congruent with the relative switching positions 1, 2, 3 and 4 shown in FIGS. 8 through 11 based on the centrically symmetrical design of the crank disk 9 (the crank segment A is mirror-inverted relative to crank segment E, crank segment B is mirror-inverted relative to crank segment F, crank segment C is mirror-inverted relative to crank segment G, and crank segment D is mirror-inverter relative to crank segment H, cf. FIG. 11). Moreover, the total crank angle is also visualized by means of the bold broken line in FIG. 11. It is seen that all crank segments A through H taken together add up to an angle of 3×360=1,080 in this embodiment.

Thus, since the relative switching position of the crank disk 9 is known to the electronic control unit of the actuating device, the stop bolt M1, M2, M3 or M4 that assumes precisely the relative position corresponding to the gear P in this position of the crank disk 10 (here the right stop) is activated within the crank segment assigned to this stop bolt M1, M2, M3 or M4.

In the situation according to FIG. 8, the transmission is consequently in gear P. The rotary switch 10 or the crank disk 9 shall be in the relative switching position 1 according to FIG. 8, because the rotary switch was turned into the relative switching position 1 before the system was previously ended (e.g., before turning off the ignition or before leaving the vehicle) in order to select the transmission position P.

At the time of the restart of the system (for example, when turning on the ignition), the electromagnets M2, M3 and M4 are energized with a voltage, as a result of which the stop bolts M2, M3 and M4 are deactivated or retracted. Thus, the only now still extended stop bolt M1 of the only electromagnet now still turned off forms the stop for the crank segment A belonging to the stop bolt M1 (for the assignment of the crank segments A through H, see FIG. 11) on the crank disk. The rotary switch can thus be turned only clockwise in order to thus select the gears R, N or D, while the relative switching position 1 represents the transmission position P in this case.

The transmission is again in gear P in the situation according to FIG. 9. The rotary switch or the crank disk shall be in the relative switching position 2 here, for example, because gear R was the gear engaged last before ending the system (e.g., before turning off the ignition or before leaving the vehicle). The transmission shall then have moved from gear R automatically into gear P after turning off the ignition (so-called Auto P function, automatic engagement of the parking brake).

When the system is restarted (for example, when the ignition is turned on), the electromagnets M1, M3 and M4 are now energized with a voltage, as a result of which the stop bolts M1, M3 and M4 are deactivated or retracted. The only still extended stop bolt M2 of the only electromagnet that is still turned off now forms the stop for the crank segment F belonging to the stop bolt M2 on the crank disk (for the assignment of the crank segments A through H, see FIG. 11). The rotary switch can thus again be turned clockwise only in order to thus select the gears R, N or D, whereas the engaged transmission position P is represented by the relative switching position 2 of the crank disk 9 in this case.

Figure 10:
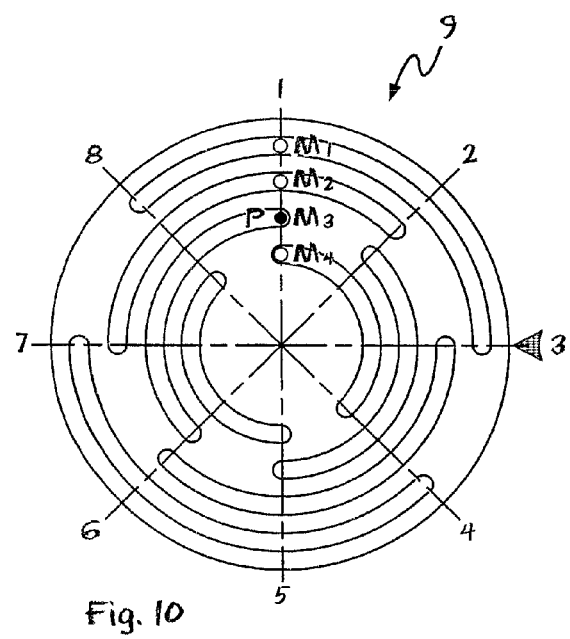
FIG. 10 is a schematic view of the crank arrangement and the stop elements of the blocking means according to FIGS. 8 and 9 in a third relative switching position with the transmission in position "P", the view corresponding to FIGS. 8 and 9.

The transmission is again in gear P in the situation according to FIG. 10. The rotary switch or the crank disk shall be in the relative switching position 3 here, for example, because gear N was the gear last engaged before ending the system (e.g., before turning off the ignition or before leaving the vehicle). The transmission shall then have moved automatically from gear N into gear P (Auto P function, automatic engagement of the parking brake) after turning off the ignition.

When the system is restarted (for example, when the ignition is turned on), the electromagnets M1, M2 and M4 are energized with a voltage, as a result of which the stop bolts M1, M2 and M4 are deactivated or retracted. Thus, the only now still extended stop bolt M3 of the only electromagnet that is still turned off now thus forms the stop for the crank segment C belonging to the stop bolt M3 on the crank disk (for the assignment of the crank segments A through H, see FIG. 11). Thus, the rotary switch can be turned again only clockwise in order to thus select the gears R, N or D, whereas the engaged transmission position P is represented by the relative switching position 3 of the crank disk 9 in this case.

In the situation according to FIG. 11, the transmission is again in gear P. The rotary switch or the crank disk shall be in the relative switching position 4 here, for example, because gear D was the gear last engaged before ending the system (e.g., before turning off the ignition or before leaving the vehicle). The transmission shall then have moved again automatically from gear D into gear P (Auto P function, automatic engagement of the parking brake) after turning off the ignition.

At the time of a restart of the system (for example, when the ignition is turned on), the electromagnets M1, M2 and M3 are now energized with a voltage, as a result of which the stop bolts M1, M2 and M3 are deactivated or retracted. Thus, the only now still extended stop bolt M4 of the only electromagnet that is now still turned off forms the stop for the crank segment H belonging to the stop bolt M4 on the crank disk. The rotary switch can thus again be turned only clockwise in order to thus select the gears R, N or D, whereas the engaged transmission position P is represented by the relative switching position 4 of the crank disk 9 in this case.

The situations in the other relative switching positions 5, 6, 7 and 8 of the rotary switch or the crank disk will then again agree congruently with the respective situation according to FIGS. 8, 9, 10 and 11 based on the centrically symmetrical design of the crank disk 9 (crank segment A is mirror-inverted relative to crank segment E, crank segment B is mirror-inverted relative to crank segment F, crank segment C is mirror-inverted relative to crank segment G, and crank segment D is mirror-inverted relative to crank segment H, cf. FIG. 11).

A restart of the system or reset of the actuating device may, moreover, also take place with the transmission position R, N or D. This happens, for example, when the driver's command entered by a corresponding rotation of the rotary switch 10 has not been implemented by the transmission, for example, because of a disturbance, an unacceptable operating state or the like. Depending on the actual current position of the transmission and the new relative switching position of the rotary switch 10 or the crank disk 9, the corresponding stop bolts M1 through M4 are activated or deactivated in such a case, so that the relative position of the crank disk 9 and of the activated stop bolt will again agree with the actual state of the transmission.

FIGS. 12 through 15 pertain to the so-called "shift lock" function in gear P. To prevent the vehicle from setting into motion accidentally or in an uncontrolled manner, gears can be engaged from the transmission position P (parking brake) only when the driver has his foot on the brake. The rotary switch is therefore blocked for safety reasons when the transmission position P is engaged in the sense of the shift lock function until the driver actuates the service brake. The situations according to FIGS. 12 through 15 arise in this case concerning the possible relative position between the crank disk 9 and the stop bolts M1 through M4.

Figure 12:
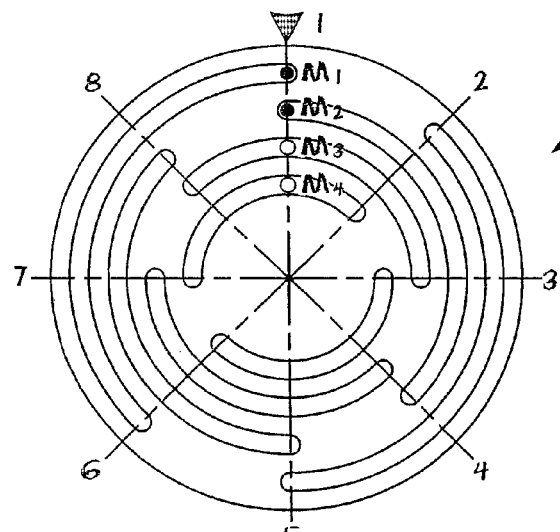
FIG. 12 is a schematic view of the crank arrangement and the stop elements of the blocking means according to FIGS. 8 through 11 in the first relative switching position with the transmission in position "P" and with the actuating element blocked (shift lock) in a view corresponding to FIGS. 8 through 11.

In the situation according to FIG. 12, the transmission is again in gear P. The rotary switch or the crank disk shall be in the relative switching position 1 here with the ignition turned on. Only the electromagnets M3 and M4 (or none of the electromagnets) are now energized with a voltage, as a result of which the extended stop bolt M1 forms the left stop of the rotary switch 10 according to switching position P together with the crank segment A (for the assignment of the crank segments A through H, see FIG. 11), on the one hand, and, on the other hand, the stop bolt M2 prevents shifting out of shift position P or completely blocks the rotary switch together with the stop bolt M1. M2 (or optionally M2 through M4) is energized with a voltage by the electronic control unit only when the service brake is pressed, so that shifting out of P becomes possible. The situation according to FIG. 8 arises in this case.

The transmission is again in gear P in the situation according to FIG. 13. The rotary switch or the crank disk shall be in the relative switching position 2 here with the ignition turned on. Only the electromagnets M1 and M4 (or none of the electromagnets) are energized with a voltage now, as a result of which the extended stop bolt M2 forms, together with the crank segment F (for the assignment of the crank segment A through H, see FIG. 11), the left stop of the rotary switch 10 according to shift position P, on the one hand, and, on the other hand, the stop bolt M3 prevents shifting out of the shift position P or completely blocks the rotary switch together with the stop bolt M2. M3 (besides M1 and M4) is also energized with a voltage by the electronic control unit only when the service brake is pressed, so that shifting out of P becomes possible. The situation according to FIG. 9 arises in this case.

In the situation according to FIG. 14, the transmission is again in gear P. The rotary switch or the crank disk shall be in the relative switching position 3 with the ignition turned on. The electromagnets M1 and M2 (or none of the electromagnets) are energized with a voltage, as a result of which the extended stop bolt M3 forms the left stop of the rotary switch 10 according to shift position P together with the crank segment C (for the assignment of the crank segments A through H, see FIG. 11), on the one hand, and, on the other hand, the stop bolt M4 prevents shifting out of the shift position P or completely blocks the rotary switch together with the stop bolt M3. M4 (besides M1 and M2) is also energized with a voltage by the electronic control unit only when the service brake is pressed, so that shifting out of P becomes possible. The situation according to FIG. 10 arises in this case.

In the situation according to FIG. 15, the transmission is again in gear P. The rotary switch or the crank disk shall be in the relative switching position 4 with the ignition turned on. Only the electromagnets M2 and M3 (or none of the electromagnets) are energized with a voltage, as a result of which the extended stop bolt M4 forms the left stop of the rotary switch 10 together with the crank segment H (for the assignment of the crank segments A through H, see FIG. 11), on the one hand, and, on the other hand, the stop bolt M1 prevents shifting out of the shift position P or completely blocks the rotary switch together with the stop bolt M4. M1 (besides M2 and M3) is also energized with a voltage by the electronic control unit only when the service brake is pressed, so that shifting out of P becomes possible. The situation according to FIG. 11 arises in this case.

The situations in the other relative switching position 5, 6, 7 and 8 of the rotary switch 10 and the crank disk 9 again agree congruently with the respective situations according to FIGS. 12, 13, 14 and 15 based on the centrically symmetrical design of the crank disk 9 (crank segment A is mirror-inverted relative to crank segment E, crank segment B is mirror-inverted relative to crank segment F, crank segment C is mirror-inverted relative to crank segment G, and crank segment D is mirror-inverted relative to crank segment H, cf. FIG. 11).

FIGS. 16 through 19 likewise pertain to a shift lock function, but relative to the gear N here. To prevent the vehicle from setting into motion accidentally or in an uncontrolled manner, gears can be engaged from the transmission position N (Neutral or idle of the transmission) only when the driver has his foot on the brake. The rotary switch 10 is therefore blocked for safety reasons with the transmission position N engaged in the sense of the shift lock function until the driver actuates the service brake. The situations according to FIGS. 16 through 19 arise in this case concerning the possible relative position between the crank disk 9 and the stop bolts M1 through M4.

In the situation according to FIG. 16, the transmission is in gear N. The rotary switch or the crank disk shall be in the relative switching position 3 with the ignition turned on. Only the electromagnet M2 (or none of the electromagnets) is energized with a voltage, as a result of which the extended stop bolt M1 represents the relative angular position of the rotary switch 10 according to shift position N together with the crank segment F (for the assignment of the crank segments A through H, see FIG. 11), on the one hand, and, on the other hand, the stop bolts M3 and M4 prevent shifting out of the shift position N or completely block the rotary switch. M3 and M4 (besides M2) are also energized with a voltage by the electronic control unit only when the service brake is pressed, so that shifting out of N becomes possible.

In the situation according to FIG. 17, the transmission is again in gear N with the ignition turned on. The rotary switch or the crank disk shall be in the relative switching position 4. Only the electromagnet M3 (or none of the electromagnets) is energized with a voltage, as a result of which the extended stop bolt M2 represents the relative angular position of the rotary switch 10 according to shift position N together with the crank segment C (for the assignment of the crank segments A through H, see FIG. 11), on the one hand, and, on the other hand, the stop bolts M1 and M4 prevent shifting out of shift position N or completely block the rotary switch. M1 and M4 (besides M3) are also energized with a voltage by the electronic control unit only when the service brake is pressed, so that shifting out of N becomes possible.

In the situation according to FIG. 18, the transmission is again in gear N with the ignition turned on. The rotary switch or the crank disk shall be in the relative switching position 5. Only the electromagnet M4 (or none of the electromagnets) is energized with a voltage, as a result of which the extended stop bolt M3 represents the relative angular position of the rotary switch 10 according to shift position N together with the crank segment C (for the assignment of the crank segments A through H, see FIG. 11), on the one hand, and, on the other hand, the stop bolts M1 and M2 prevent shifting out of the shift position N or completely block the rotary switch. M1 and M2 (besides M4) are also energized with a voltage by the electronic control unit only when the service brake is pressed, after which the blocking of the rotary switch is abolished and shifting out of N becomes possible.

In the situation according to FIG. 19, the transmission is again in gear N with the ignition turned on. The rotary switch or the crank disk shall be in the relative switching position 6. Only the electromagnet M1 (or none of the electromagnets) is energized with a voltage, as a result of which the extended stop bolt M4 represents the relative angular position of the rotary switch 10 according to shift position N together with the crank segment H (for the assignment of the crank segments A through H, see FIG. 11), on the one hand, and, on the other hand, the stop bolts M2 and M3 prevent shifting out of shift position N or completely block the rotary switch. M2 and M3 (besides M1) are also energized with a voltage by the electronic control unit only when the service brake is pressed, as a result of which the blocking of the rotary switch is abolished and shifting out of N becomes possible.

The situations in the other relative switching positions 7 and 8 as well as 1 and 2 of the rotary switch 10 and of the crank 9 again agree congruently with the respective situations according to FIGS. 16, 17, 18 and 19 based on the centrically symmetrical design of the crank disk 9 (crank segment A is mirror-inverted relative to crank segment E, crank segment B is mirror-inverted relative to crank segment F, crank segment C is mirror-inverted relative to crank segment G, and crank segment D is mirror-inverted relative to crank segment H, cf. FIG. 11).

FIGS. 20 through 23 pertain to the so-called "reverse lock." To prevent gear R (reverse gear) from being engaged at a forward travel speed above a certain speed limit, for example, above 5 km/hr., as a result of which the powertrain can be damaged, gear R can be engaged only when the vehicle is moving forward at a speed lower than the set speed limit. Shift position R is therefore blocked on the rotary switch for safety reasons as long as the vehicle is moving forward at a speed higher than the speed limit. The situations according to FIGS. 20 through 23 arise in this case concerning the possible relative positions between the crank disk 9 and the stop bolts M1 through M4.

In the situation according to FIG. 20, the transmission shall be in gear D during forward travel of the vehicle at a speed above the reverse lock speed limit. The rotary switch or the crank disk shall be in relative switching position 4. The electromagnets M2 and M4 are energized with a voltage, as a result of which the extended stop bolt M1 represents the relative angular position of the rotary switch 10 according to shift position D together with the crank segment A (for the assignment of the crank segments A through H, see FIG. 11), on the one hand, and, on the other hand, the stop bolt M3 prevents shift position R from being engaged. M3 is additionally energized with a voltage by the electronic control unit only when the forward speed becomes lower than the speed limit of the reverse lock, as a result of which the previously existing limitation of the rotation angle range of the rotary switch 10 to the positions D and N is again abolished. Thus, the reverse gear (as well as the parking brake) can now be engaged.

In the situation according to FIG. 21, the transmission is again in gear D during forward travel of the vehicle at a speed above the reverse block speed limit. The rotary switch or the crank disk shall be in the relative switching position 5. The electromagnets M1 and M3 are energized with a voltage, as a result of which the extended stop bolt M2 represents the relative angular position of the rotary switch 10 according to shift position D together with the crank segment F (for the assignment of the crank segments A through H, see FIG. 11), on the one hand, and, on the other hand, the stop bolt M4 prevents the reverse gear from being engaged. M4 is additionally energized with a voltage by the electronic control unit only when the forward travel speed becomes lower than the speed limit of the reverse lock, as a result of which the previously existing limitation of the rotation angle range of the rotary switch 10 to positions D and N only is again abolished. The reverse gear (as well as the parking brake) can now be engaged again.

In the situation according to FIG. 22, the transmission is again in gear D during forward travel of the vehicle at a speed above the reverse lock speed limit. The rotary switch or the crank disk shall be in the relative switching position 6. The electromagnets M2 and M4 are energized with a voltage, as a result of which the extended stop bolt M3 represents the relative angular position of the rotary switch 10 according to shift position D together with the crank segment C (for the assignment of the crank segments A through H, see FIG. 11), on the one hand, and, on the other hand, the stop bolt M1 prevents the reverse gear from being engaged. M1 is additionally energized with a voltage by the electronic control unit only when the forward travel speed becomes lower than the speed limit of the reverse lock, as a result of which the previously existing limitation of the rotation angle range of the rotary switch 10 to positions D and N only is again abolished. The reverse gear (as well as the parking brake) can thus again be engaged.

In the situation according to FIG. 23, the transmission is again in gear D during forward travel of the vehicle at a speed above the reverse lock speed limit. The rotary switch or the crank disk shall be in relative switching position 7. The electromagnets M1 and M3 are energized with a voltage, as a result of which the extended stop bolt M4 represents the relative angular position of the rotary switch 10 according to shift position D together with the crank segment H (for the assignment of the crank segments A through H, see FIG. 11), on the one hand, and, on the other hand, the stop bolt M2 prevents the reverse gear from being engaged. M2 is additionally energized with a voltage by the electronic control unit only when the forward travel speed becomes lower than the speed limit of the reverse lock, as a result of which the previously existing limitation of the rotation angle range of the rotary switch to the positions D and N is abolished. Thus, the reverse gear (as well as the parking brake) can now be engaged.

The situations in the other relative switching positions 8 as well as 1, 2 and 3 of the rotary switch 10 and of the crank disk 9 now again agree congruently with the respective situation according to FIGS. 20, 21, 22 and 23 based on the centrically symmetrical design of the crank disk 9 (crank segment A is mirror-inverted relative to crank E, crank segment B is mirror-inverted relative to crank segment F, crank segment C is mirror-inverted relative to crank segment G, and crank segment D is mirror-inverted relative to crank segment H, see FIG. 11).

FIGS. 24 through 27 show possible situations for the case in which the ignition is turned off or in case of system or power failure. All magnets are currentless in these cases and all stop bolts M1 through M4 are thus extended, so that the rotary switch 10 is completely blocked in each case and in every possible relative switching position 1 through 8.

Thus, when attempting to actuate the transmission, the driver immediately receives the information, also in a tactile form, that shift commands cannot be carried out at present. An override system (not shown) ensures that in case of failure of the electromagnets only, or in case of failure of the magnet activation, the rotary switch 10 can nevertheless still be actuated in the sense of an emergency operation by means of a mechanical release.

The situations in the other relative switching positions 7 and 8 as well as 1 and 2 of the rotary switch 10 and of the crank disk 9, which are not shown in FIGS. 24 through 27, again agree congruently with the respective situations according to FIGS. 24, 25, 26 and 27 based on the centrically symmetrical design of the crank disk 9 (crank segment A is mirror-inverted relative to crank segment E, crank segment B is mirror-inverted relative to crank segment F, crank segment C is mirror-inverted relative to crank segment G, and crank segment D is mirror-inverted relative to crank segment H, cf. FIG. 11).

FIG. 28 shows another embodiment of an actuating device for an automatic transmission in a schematic exploded view. The rotary switch or knob 10 of the actuating device, arranged above a housing upper part 17, is at first recognized. The knob, which is unlimitedly rotatable by itself, is essentially rotationally symmetrical and its relative switching position cannot be inferred from its shape. Furthermore, a magnet arrangement with four electromagnets 18 is recognized from FIG. 28. The mobile armatures 19 of the electromagnets 18 form at the same time the stop bolts M1 through M4 of the actuating device. A board 21, which carries the electronic control unit of the actuating device, which unit is not shown here, is located under the magnet arrangement 18 as well as above the housing bottom 20. Furthermore, the electric terminals 22 for connecting the actuating device to the transmission control device, as well as a sensor 23 for determining the relative switching position of the knob 10 and the crank disk 9, are arranged on the board 21.

The crank disk 9 itself is located between the housing upper part 17 and the housing lower part 24 and carries, moreover, on its top side, the housing 25 for a spring-loaded locking element 26. The shaft 27, on which the knob 10 and the crank disk 9 are arranged and are connected to one another in such a way that they rotate in unison, carries at its lower end a permanent magnet 28, whose magnetic axis is arranged at right angles to the shaft 27. The magnetic field of the permanent magnet 28 acts on the rotation angle sensor 23, whereby the electronic control unit of the actuating device can determine the relative switching position of the knob 10 and the crank disk 9 at any time.

In a view corresponding to FIG. 28, FIG. 29 shows the bottom view of the actuating device according to FIG. 28. The housing bottom 20, the control board 21, the electromagnet arrangement 18 with armatures 19, the housing lower part 24, the locking element 26, the crank disk 9, the shaft 27, the housing upper part 17, as well as the knob 10 arranged on a knob carrier 29 are arranged from bottom to top.

Unlike in FIG. 28, FIG. 29 also shows the locking contour 30, which is arranged in the housing upper part and which ensures the reliable locking of the knob 9 in its relative switching positions, of which there are eight in this embodiment, by cooperating with the spring-loaded locking element 26, as well as a pleasant and clear touch during the operation of the knob 9. Furthermore, the shape of the crank disk 9 with the crank segments and with the crank blocks K, L, M and N is also recognized in FIG. 29, cf. FIGS. 33 through 36.

FIGS. 30 and 31 show a schematic longitudinal section each through the actuating device according to FIGS. 28 and 29, along the section plane indicated in FIG. 32. The difference between the views according to FIG. 30 and FIG. 31 is that the electromagnets 18 in FIG. 30 are energized with a voltage, and the stop bolts or armatures 19 according to FIG. 30 are therefore in the deactivated or retracted position. By contrast, the electromagnets 18 are currentless in FIG. 31, as a result of which the stop bolts or armatures 19 are activated or extended and thus engage the contours on the underside of the crank disk 9. FIGS. 30 and 31 also show, in particular, the cooperation of the permanent magnets 28 with the rotation angle sensors 23, which are arranged directly under the permanent magnet 28 in the assembly, as well as the cooperation of the locking elements 26 and the locking contour 30 in the housing upper part 17.

The function of the crank disk of the actuating device according to FIGS. 28 through 31 is, in principle, for the most part analogous to that of the crank disk according to FIGS. 8 through 27. However, the crank segments on the crank disk of the actuating device according to FIGS. 28 through 31 are arranged in a different manner compared to the crank segments of the crank disk according to FIGS. 8 through 27. The difference in the arrangement of the crank segments between the crank disk of the actuating device according to FIGS. 28 through 31 and the crank disk according to FIGS. 8 through 27 or a transfer of the geometry of the latter crank disk appears from the views in FIGS. 33 through 36.

FIG. 33 shows once again the crank disk 9 with the corresponding stop bolts M1 through M4 according to FIGS. 8 through 27, while FIG. 36 shows the crank disk 9 and the stop bolts M through M4 of the actuating device according to FIGS. 28 through 31. FIGS. 34 and 35 show two imaginary intermediate steps in the transfer of the geometry of the crank disk 9 according to FIG. 33 into the geometry of the crank disk 9 according to FIG. 36.

FIG. 33 shows once again that a crank area each, arranged on a certain radial section, with two crank segments each (M1: crank segments A and E, M2: crank segments B and F, M3: crank segments C and G, M4: crank segments D and H), belongs to each of the stop bolts M1 through M4.

By contrast, it is shown in the first transfer step according to FIG. 34 that—for each of the three stop bolts M2, M3 and M4—both the stop bolt and its crank area, which belongs to it and comprises two crank segments each, are arranged rotated by a certain angle in relation to the crank disk 9 compared to the arrangement according to FIG. 33. Thus, both the stop bolt M2 and its crank area, comprising the crank segments B and F, are arranged rotated clockwise by 90 in relation to the crank disk 9 according to FIG. 33. The stop bolt M3 as well as its crank area comprising the crank segments C and G is arranged rotated counterclockwise by 90 in relation to the crank disk 9 according to FIG. 33, whereas, finally, the stop bolt M4 as well as its crank area comprising the crank segments D and H is arranged rotated by 180 in relation to the crank disk 9. Only one of the two crank segments is shown in the view according to FIG. 34 for each of the crank areas of the stop bolts M2, M3 and M4 each for better recognizability.

Due to this rotation of the positions of both the stop bolts M2, M3 and M4 as well as the respective crank segments B through H thereof, which belong to them, the arrangement of the crank segments according to FIG. 35 is now obtained. It is recognized that as a consequence of the rotation according to FIG. 34, the two inner crank areas with the crank segments C and G as well as D and H exactly agree now with the two outer crank areas, comprising the crank segments A and E as well as B and F concerning the angle ranges covered by the crank segments C and G as well as D and H.

However, this means that the two inner crank areas with the crank segments C and G as well as D and H are potentially redundant and can therefore be combined with the two outer crank areas, comprising the crank segments A and E as well as B and F, as this shall be symbolized by the arrows shown in FIG. 35. The two inner crank areas thus congruently coincide with the two outer crank areas, while the two inner stop bolts M3 and M4 are likewise shifted outwardly, as this is indicated by the two arrows drawn in broken lines in FIG. 35. As a result, two double crank areas as well as four double crank segments (double crank segment A+G, double crank segment B+D, double crank segment E+C, and double crank segment F+H) are formed from the previously four independent double crank areas, which were previously radially separated from one another, with the eight separate crank segments A through H.

For the sake of clarity, such a double crank area shall, however, continue to be considered to be an arrangement comprising two congruent ("logic") crank areas for two different stop bolts, and a double crank segment (for example, the double crank segment A+G) shall continue to be considered to be an arrangement comprising two congruent ("logic") crank segments (for example, A and G) for two different stop bolts (for example, M1 and M3).

As a last step of the transfer of the crank disk 9 according to FIG. 33 into the crank disk 9 according to FIG. 36, the double crank segments A+G, B+D, E+C and F+H, of which there are four now because of the combination of the eight crank segments A through H, are replaced by four crank blocks K, L, M, N. In other words, this means that the crank segments A through H or double crank segments A+G, B+D, E+C and F+D, which were previously represented in the form of depressed recesses ("negative") in the crank disk 9, are now replaced, with unchanged functionality, by the crank blocks K, L, M, N arranged as elevated blocks on the crank disk 9 ("positive"), cf. the isometric view of the crank disk 9 in FIG. 29.

The arrangement of the crank segments or crank blocks K, L, M, N and of the stop bolts M1, M2, M3 and M4 according to the view in FIG. 36 is especially advantageous because it is thus possible both to save space needed for installation and to improve the robustness of the blocking means of the rotary switch. This applies above all to the arrangement of the stop bolts M1, M2, M3 and M4 and of the electromagnets 18, which do not have to be arranged in a crowded manner in one row any longer (cf. FIG. 33), but they can rather be distributed optimally on the entire surface available, cf. FIG. 36 as well as FIGS. 28 and 29.

FIGS. 37 through 56 show again—analogously to the views in FIGS. 8 through 26—schematic views of the crank arrangement K, L, M, N and the stop bolts M1, M2, M3 and M4 of the blocking means for the actuating device according to FIGS. 28 through 32 in different switching positions.

The crank disk 9 corresponds here to the crank disk 9 according to FIG. 36 (cf. description for FIG. 36). The recesses of the crank areas A through H according to FIGS. 8 through 26 are replaced, as was described above, by the elevated crank blocks K, L, M. N. The blocking means again comprises four stop bolts M1, M2, M3 and M4.

The blocking means according to FIGS. 37 through 56 belongs to the actuating device according to FIGS. 28 through 32, which can again assume four switching positions analogously to the actuating device shown in FIG. 7. This means that a "separate" crank area as well as a separate stop bolt M1, M2, M3 and M4 is assigned to each of the four shift positions, for example, P, R, N and D of an automatic transmission (based on the description of the double crank segments according to FIGS. 35 and 36).

The crank segments are again arranged distributed in such a way that for each of the eight possible relative switching positions of the crank disk 9, the four stop bolts, taken together, always occupy, within their respective crank segments, all four relative positions, which correspond to the gears P, R, N and D in this embodiment.

In other words, there always is exactly one stop bolt M1, M2, M3 or M4 for each of the possible relative switching positions 1 through 8, of which there are eight here as a consequence of the switching angle W=45, see FIG. 38, for each of the gears P, R, N and D, which said stop bolt assumes at present the corresponding relative position belonging to that gear within its crank segment. As a result, the particular gear among the gears P, R, N or D to which the current position of the rotary switch and of the crank disk shall correspond can be defined or redefined at any time for each of the eight possible relative switching positions 1 through 8 of the crank disk 9 and hence also for each possible relative switching position of the rotary switch 10 according to FIGS. 28 through 32 merely by activating the corresponding the stop bolt M1, M2, M3 or M4.

It is recognized from FIG. 37 that the stop bolt M1 is activated and extended at right angles to the drawing plane (symbolized by the bold, filled-in view of the stop bolt M1), i.e., the stop bolt M1 thus engages the crank segment belonging to it between the crank block K and the crank block L. The other stop bolts M2, M3 and M4 are, by contrast, deactivated or retracted at right angles to the drawing plane in the view according to FIG. 37 and therefore do not engage their respective crank segments between the corresponding crank blocks.

In other words, this means that the crank disk 9 and the stop bolt M1 interact according to the view in FIG. 37 such that the crank disk 9 and hence also the rotary switch are located instantaneously at the left stop because of the activated stop, bolt M1 and thus they can be rotated only clockwise to the right.

The situation shown in FIGS. 37 through 40 corresponds to the gear P (parking brake). This situation develops on the actuating device especially at the time of the so-called restart of the actuating device. The "restart" situation corresponds primarily to the system state of the vehicle transmission and the actuating device at the beginning of the onset of travel and when the ignition of the motor vehicle is turned on. Before, with the ignition still turned off, the vehicle transmission was in this case, whether selected manually or automatically, in gear P, and it also maintains at first this gear P when the ignition is turned on.

The electronic control unit of the actuating device then determines the absolute angular position of the shaft 27 and hence the relative switching position of the rotary switch 10 or of the crank disk 9 at the time of the restart by means of the magnet and the sensor according to FIGS. 28, 30 and 31. The crank disk 9 can be, in fact, only in one of the four positions shown in FIGS. 37 through 40, because the four relative switching positions 5, 6, 7 and 8 not shown in FIGS. 37 through 40 are congruent with the relative switching positions 1, 2, 3 and 4 shown in FIGS. 37 through 40 based on the centrically symmetrical design of the crank disk 9 (crank block K is mirror-inverted relative to crank block L, and crank block M is mirror-inverted relative to crank block N).

Since the relative switching position of the crank disk 9 is known to the electronic control unit of the actuating device, the stop bolt that assumes precisely the relative position corresponding to gear P (i.e., right stop) within the crank segment assigned to the stop bolt in question in this position of the crank disk 9 is activated.

In the situation according to FIG. 37, the transmission is in gear P. The rotary switch or the crank disk 9 shall be in the relative switching position 1 according to FIG. 37, because the rotary switch was turned into the relative switching position 1 in order to select the transmission position P before the previous ending of the system (e.g., before turning off the ignition or before leaving the vehicle).

At the time of the restart of the system (for example, when the ignition is turned on), the electromagnets M2, M3 and M4 are now energized with a voltage, as a result of which the stop bolts M2, M3 and M4 are deactivated or retracted. The only now still extended stop bolt M1 of the only electromagnet that is now still turned off thus forms the stop for the crank segment belonging to the stop bolt M1 between the crank block K and the crank block L on the crank disk 9 (for the assignment of the crank segments and the electromagnets and stop bolts belonging to them to the crank blocks K, L, M and N, see FIGS. 33 through 36). The rotary switch can thus be turned only clockwise in order to thus select the gears R, N or D, while the relative switching position 1 represents the gear position P in this case.

In the situation according to FIG. 38, the transmission is again in gear P. The rotary switch or the crank disk 9 shall be in the relative switching position 2 here, for example, because gear R was the gear engaged last before the ending of the system (e.g., before turning off the ignition or before leaving the vehicle). The transmission shall then have moved automatically from gear R into gear P after the ignition was turned off (so-called Auto P function, automatic engagement of the parking brake).

At the time of the restart of the system (for example, when the ignition is turned on), the electromagnets M1, M3 and M4 are now energized with a voltage, as a result of which the stop bolts M1, M3 and M4 are deactivated or retracted. Thus, the only now still extended stop bolt M2 of the only electromagnet that is now still turned off forms the stop for the crank segment belonging to the stop bolt M2 (for the assignment of the crank segments and the stop bolts belonging to them to the crank blocks K, L, M and N, see FIGS. 33 through 36). The rotary switch can thus again be turned only clockwise in order to thus select the gears R, N or D, while the engaged transmission position P is represented by the relative switching position 2 of the crank disk 9 in this case.

In the situation according to FIG. 39, the transmission is again in gear P. The rotary switch or the crank disk 9 shall be in the relative switching position 3 here, for example, because gear N was the gear engaged last before the ending of the system (e.g., before turning off the ignition or before leaving the vehicle). The transmission shall then have moved automatically from gear R into gear P (Auto P function, automatic engagement of the parking brake) after the ignition was turned off.

At the time of the restart of the system (for example, when turning on the ignition), the electromagnets M1, M2 and M4 are now energized with a voltage, as a result of which the stop bolts M1, M2 and M4 are deactivated or retracted. Thus, the only now still extended stop bolt M3 of the only electromagnet that is now still turned off forms the stop for the crank segment belonging to the stop bolt M3 (for the assignment of the crank segments and the stop bolts belonging to them to the crank blocks K, L, M and N, see FIGS. 33 through 36). The rotary switch can thus again be turned only clockwise in order to select the gears R, N or D, while the engaged transmission position P is represented by the relative switching position 3 of the crank disk 9 in this case.

In the situation according to FIG. 40, the transmission is again in gear P. The rotary switch or the crank disk 9 shall be in the relative switching position 4 here, for example, because gear D was the gear engaged last before the ending of the system (e.g., before turning off the ignition or before leaving the vehicle). The transmission shall then have again moved automatically from gear D into gear P (Auto P function, automatic engagement of the parking brake) after turning off the ignition.

At the time of the restart of the system (for example, when the ignition is turned on), the electromagnets M1, M2 and M3 are now energized with a voltage, as a result of which the stop bolts M1, M2 and M3 are deactivated or retracted. Thus, the only now still extended stop bolt M4 of the only electromagnet that is now still turned off forms the stop for the crank segment belonging to the stop bolt M4 (for the assignment of the crank segments and the stop bolts belonging to them to the crank blocks K, L, M and N, see FIGS. 33 through 36). The rotary switch can thus again be rotated only clockwise in order to thus select the gears R, N or D, while the engaged transmission position P is represented by the relative switching position 4 of the crank disk 9 in this case.

The situation in the other relative switching positions 5, 6, 7 and 8 of the rotary switch 10 and of the crank disk 9 agree again congruently with the respective situations according to FIGS. 37, 9, 10 and 11) based on the centrically symmetrical design of the crank disk 9 (crank block K is mirror-inverted relative to crank block L, and crank block M is mirror-inverted relative to crank block N).

A restart of the system or reset of the actuating device can, moreover, also take place with the transmission position R, N or D engaged. This happens, for example, when the driver's command, entered by correspondingly turning the rotary switch 10, was not implemented by the transmission, for example, because of a disturbance, an unacceptable operating state or the like. Depending on the actual current transmission position and the new relative switching position of the rotary switch 10 and of the crank disk 9, the corresponding stop bolts M1 through M4 are now activated and deactivated in such a case, so that the relative angular position of the crank disk 9 and of the now activated stop bolt will again agree with the actual state of the transmission.

FIGS. 41 through 44 pertain to the so-called "shift lock" function in gear P. To prevent the vehicle from setting into motion accidentally or in an uncontrolled manner, gears can be engaged from the transmission position P (parking brake) only when the driver has his foot on the brake. The rotary switch 10 is therefore blocked for safety reasons with the transmission position P engaged in the sense of the shift lock function until the driver actuates the service brake. The situations according to FIGS. 41 through 44 arise in this case concerning the possible relative position between the crank disk 9 and the stop bolt.

In the situation according to FIG. 41, the transmission is again in gear P. The rotary switch 10 or the crank disk 9 shall be in the relative switching position 1 here with the ignition turned on. Only the electromagnets of the stop bolts M3 and M4 (or none of the electromagnets) are energized now with a voltage, as a result of which the extended stop bolt M1 at the crank block K forms the left stop of the rotary switch 10 according to shift position P, on the one hand, and, on the other hand, the stop bolt M2 at the crank block N prevents shifting out of the shift position P or completely blocks the rotary switch 10 together with the stop bolt M1. M2 (or optionally M2 through M4) is energized with a voltage by the electronic control unit only when the service brake is pressed, so that it becomes possible to shift out of P. The situation according to FIG. 37 arises in this case.

In the situation according to FIG. 42, the transmission is again in gear P. The rotary switch 10 or the crank disk 9 shall be in the relative switching position 2 here with the ignition turned on. Only the electromagnets of the stop bolts M1 and M4 (or none of the electromagnets) are energized now with a voltage, as a result of which the extended stop bolt M2 at the crank block N forms the left stop of the rotary switch 10 according to shift position P, on the one hand, and, on the other hand, the stop bolt M3 at the crank block L prevents shifting out of the shift position P or completely blocks the rotary switch 10 together with the stop bolt M2. M3 (besides M1 and M4) is also energized with a voltage by the electronic control unit only when the service brake is pressed, so that it becomes possible to shift out of P. The situation according to FIG. 38 arises in this case.

In the situation according to FIG. 43, the transmission is again in gear P. The rotary switch 10 or the crank disk 9 shall be in the relative switching position 3 with the ignition turned on. The electromagnets M1 and M2 (or none of the electromagnets) are energized with a voltage, as a result of which the extended stop bolt M3 at the crank block L forms the left stop of the rotary switch 10 according to shift position P, on the one hand, and, on the other hand, the stop bolt M4 at the crank block N prevents shifting out of the shift position P or completely blocks the rotary switch 10 together with the stop bolt M3. M4 (besides M1 and M2) is also energized with a voltage by the electronic control unit only when the service brake is pressed, so that it becomes possible to shift out of P. The situation according to FIG. 39 arises in this case.

In the situation according to FIG. 44, the transmission is again in gear P. The rotary switch 10 or the crank disk 9 shall be in the relative switching position 4 with the ignition turned on. Only the electromagnets of the stop bolts M2 and M3 (or none of the electromagnets) are energized with a voltage, as a result of which the extended stop bolt M4 at the crank block N forms the left stop of the rotary switch 10 according to shift position P, on the one hand, and, on the other hand, the stop bolt M1 at the crank block L prevents shifting out of the shift position P or it completely blocks the rotary switch 10 together with the stop bolt M4. M1 (besides M2 and M3) is also energized with a voltage by the electronic control unit only when the service brake is pressed, so that it becomes possible to shift out of P. The situation according to FIG. 40 arises in this case.

The situations in the other relative switching positions 5, 6, 7 and 8 of the rotary switch 10 or the crank disk 9 again agree congruently with the respective situations according to FIGS. 12, 13, 14 and 15 based on the centrically symmetrical design of the crank disk 9 (crank block K is mirror-inverted relative to crank block L, and crank block M is mirror-inverted relative to crank block N).

FIGS. 45 through 48 likewise pertain to a shift lock function, but here with respect to the gear N. To prevent the vehicle from setting into motion accidentally or in an uncontrolled manner, gears can be engaged from the transmission position N (Neutral or idle) only when the driver has his foot on the brake. Therefore, the rotary switch 10 is blocked for safety reasons with the transmission position N engaged in the sense of the shift lock function until the driver actuates the service brake. The situations according to FIGS. 45 through 48 arise in this case concerning the possible relative position between the crank disk 9 and the stop bolt.

In the situation according to FIG. 45, the transmission is in gear N. The rotary switch 10 or the crank disk 9 shall be in the relative switching position 3 with the ignition turned on. Only the electromagnet M2 (or none of the electromagnets) is energized with a voltage, as a result of which the extended stop bolt M1 represents the relative angular position of the rotary switch 10 according to shift position N together with the crank segment belonging to it between the crank blocks K and L (for the assignment of the crank segments and the stop belongs belong to them to the crank blocks K, L, M and N, see FIGS. 33 through 36), on the one hand, and, on the other hand, the stop bolts M3 and M4 prevent shifting out of the shift position N or completely block the rotary switch 10. M3 and M4 (besides M2) are also energized with a voltage by the electronic control unit only when the service brake is pressed, so that it becomes possible to shift out of N.

In the situation according to FIG. 46, the transmission is in gear N with the ignition turned on. The rotary switch 10 or the crank disk 9 shall be in the relative switching position 4. Only the electromagnet M3 (or none of the electromagnets) is energized with a voltage, as a result of which the extended stop bolt M2 represents the relative switching position of the rotary switch 10 according to the shift position N together with the crank segment belong to it (for the assignment of the crank segments and the stop bolts belong to them to the crank blocks K, L, M and N, see FIGS. 33 through 36), on the one hand, and, on the other hand, the stop bolts M1 and M4 prevent shifting out of the shift position N or completely block the rotary switch 10. M1 and M4 (besides M3) are also energized with a voltage by the electronic control unit only when the service brake is pressed, so that it becomes possible to shift out of N.

In the situation according to FIG. 47, the transmission is again in gear N with the ignition turned on. The rotary switch 10 or the crank disk 9 shall be in the relative switching position 5. Only the electromagnet M4 (or none of the electromagnets) is energized with a voltage, as a result of which the extended stop bolt M3 represents the relative angular position of the rotary switch 10 according to the shift position N together with the crank segment belonging to it (for the assignment of the crank segments and the stop bolts belonging to them to the crank blocks K, L, M and N, see FIGS. 33 through 36), on the one hand, and, on the other hand, the stop bolts M1 and M2 prevent shifting out of the shift position N or completely block the rotary switch 10. M1 and M2 (besides M4) are also energized with a voltage by the electronic control unit only when the service brake is pressed, as a result of which the blocking of the rotary switch 10 is abolished and it becomes possible to shift out of N.

In the situation according to FIG. 48, the transmission is again in gear N with the ignition turned on. The rotary switch 10 or the crank disk 9 shall be in the relative switching position 6. Only the electromagnet M1 (or none of the electromagnets) is energized with a voltage, as a result of which the extended stop bolt M4 represents the relative angular position of the rotary switch 10 according to the shift position N together with the crank segment belonging to it (for the assignment of the crank segments and the stop bolts belonging to them to the crank blocks K, L, M and N, see FIGS. 33 through 36), on the one hand, and, on the other hand, the stop bolts M2 and M3 prevent shifting out of the shift position N or completely block the rotary switch 10. M2 and M3 (besides M1) are also energized with a voltage by the electronic control unit only when the service brake is pressed, as a result of which the blocking of the rotary switch 10 is abolished and it becomes possible to shift out of N.

The situations in the other relative switching positions 7 and 8 as well as 1 and 2 of the rotary switch 10 and of the crank disk 9 again agree congruently with the respective situations according to FIGS. 45, 46, 47 and 48 based on the centrically symmetrical design of the crank disk 9 (crank block K is mirror-inverted relative to crank block L, and crank block M is mirror-inverted relative to crank block N).

FIGS. 49 through 52 pertain to the so-called "reverse lock." To prevent gear R from being engaged at a forward travel speed above a certain speed limit, e.g., above 5 km/hr., as a result of which the powertrain can be damaged, gear R can be engaged only when the vehicle is moving forward at a speed below the speed limit. The shift position R at the rotary switch 10 is therefore blocked for safety reasons as long as the vehicle is moving forward at a speed higher than the speed limit. The situations according to FIGS. 49 through 52 arise in this case concerning the possible relative positions between the crank disk 9 and the stop bolt.

In the situation according to FIG. 49, the transmission is in gear D during forward travel of the vehicle at a speed above the reverse lock speed limit. The rotary switch 10 or the crank disk 9 shall be in the relative switching position 4. The electromagnets M2 and M4 are energized with a voltage, as a result of which the extended stop bolt M1 represents the relative angular position of the rotary switch 10 according to shift position D together with the crank segment belonging to it (for the assignment of the crank segments and the stop bolts belonging to it to the crank blocks K, L, M and N, see FIGS. 33 through 36), on the one hand, and, on the other hand, the stop bolt M3 prevents shift position R from being engaged together with the crank block L. M3 is additionally energized with a voltage by the electronic control unit only when the forward travel speed becomes lower than the speed limit for the reverse lock, as a result of which the previously existing limitation of the rotation angle range of the rotary switch 10 to the positions D and N only is again abolished. Thus, the Reverse (as well as the parking brake) can now be engaged.

In the situation according to FIG. 50, the transmission shall again be in gear D during forward travel of the vehicle at a speed above the reverse lock speed limit. The rotary switch 10 or the crank disk 9 shall be in the relative switching position 5. The electromagnets M1 and M3 are energized with a voltage, as a result of which the extended stop bolt M2 represents the relative angular position of the rotary switch 10 according to shift position D together with the crank segment belonging to it (for the assignment of the crank segments and the stop, bolts belong to them to the crank blocks K, L, M and N, see FIGS. 33 through 36), on the one hand, and, on the other hand, the stop bolt M4 prevents Reverse from being engaged together with the crank block N. M4 is additionally energized with a voltage by the electronic control unit only when the forward travel speed becomes lower than the speed limit of the reverse lock, as a result of which the previously existing limitation of the rotation angle range of the rotary switch 10 to the positions D and N only is again abolished. Thus, the Reverse (as well as the parking brake) can again be engaged now.

In the situation according to FIG. 51, the transmission shall again be in gear D during forward travel of the vehicle at a speed above the reverse lock speed limit. The rotary switch 10 or the crank disk 9 shall be in the relative switching position 6. The electromagnets M2 and M4 are energized with a voltage, as a result of which the extended stop bolt M3 represents the relative angular position of the rotary switch 10 according to the shift position D together with the crank segment belonging to it (for the assignment of the crank segments and the stop bolts belonging to them to the crank blocks K, L, M and N, see FIGS. 33 through 36), on the one hand, and, on the other hand, the stop bolt M1 prevents Reverse from being engaged together with the crank block L. M1 is additionally energized with a voltage by the electronic control unit only when the forward travel speed becomes lower than the speed limit of the reverse lock, as a result of which the previously existing limitation of the rotation angle range of the rotary switch 10 to the positions D and N only is again abolished. The Reverse (as well as the parking brake) can thus be engaged again now.

In the situation according to FIG. 52, the transmission shall be in gear D during forward travel of the vehicle at a speed above the reverse lock speed limit. The rotary switch 10 or the crank disk 9 shall be in the relative switching position 7. The electromagnets M1 and M3 are energized with a voltage, as a result of which the extended stop bolt M4 represents the relative angular position of the rotary switch 10 according to shift position D together with the crank segment belonging to it (for the assignment of the crank segments and the stop bolts belonging to it to the crank blocks K, L, M and N, see FIGS. 33 through 36), on the one hand, and, on the other hand, the stop bolt M2 prevents Reverse from being engaged together with the crank block M. M2 is additionally energized with a voltage by the electronic control unit only when the forward travel speed becomes lower than the speed limit of the reverse lock, as a result of which the previously existing limitation of the rotation angle range of the rotary switch 10 to the positions D and N only is abolished. The Reverse (as well as the parking brake) can thus be again engaged now.

The situations in the other relative switching positions 8 as well as 1, 2 and 3 of the rotary switch 10 and of the crank disk 8 again agree congruently with the respective situations according to FIGS. 49, 50, 51 and 52 based on the centrically symmetrical design of the crank disk 9 (crank block K is mirror-inverted relative to crank block L, and crank block M is mirror-inverted relative to crank block N).

FIGS. 53 through 56 show possible situations for the case of the ignition turned off or in case of system or power failure. All magnets are currentless in these cases and all stop bolts M1 through M4 are thus extended, so that the rotary switch 10 is completely blocked in each case and in any possible relative switching position 1 through 8.

Thus, when attempting to actuate the transmission, the driver immediately receives the information, also in a tactile form, that shift commands cannot currently be carried out. An override system (not shown) ensures that the rotary switch 10 can still be actuated in the sense of an emergency operation by means of a mechanical release in case of failure of the electromagnets only or in case of failure of the magnet activation.

The situations in the other relative switching positions 7 and 8 as well as 1 and 2 of the rotary switch 10 and of the crank disk 9 again agree congruently with the respective situations according to FIGS. 53, 54, 55 and 56 based on the centrically symmetrical design of the crank disk 9 (crank block K is mirror-inverted relative to crank block L, and crank block M is mirror-inverter relative to crank block N).

Thus, it becomes clear as a result that thanks to the present invention, an actuating device is created for electrically or electronically controlled technical systems, which makes possible just as intuitive, reliable, easy-to-understand and error-free an actuation of the technical system as this is possible in the case of mechanical actuating elements with discrete locking positions. At the same time, an intuitively detectable and especially tactile feedback of the actual state of the system, which is unambiguous under all operating conditions, is achieved thanks to the present invention.

Thus, the present invention makes a fundamental contribution to the improvement of the safety, ergonomics and operatability of complex technical systems, especially concerning use in the control of automatic transmissions and the like in motor vehicles.

While specific embodiments of the invention have been shown and described in detail to illustrate the application of the principles of the invention, it will be understood that the invention may be embodied otherwise without departing from such principles.

The invention claimed is:

1. An actuating device for an automotive technical system or for selecting gears of a shift-by-wire gear change mechanism, said actuating device comprising:
   an actuating element mounted to be unlimitedly rotatable by itself;
   a blocking means with a crank arrangement and with stop elements for limiting the angle of rotation of said actuating element to a total switching angle, wherein said actuating element can assume a number of n, where n>1, switching positions within the total switching angle, said crank arrangement having, for each of the n switching positions of said actuating device, a separate stop element of said stop elements, which can be activated as a function of the state of the technical system or gear change mechanism, and a crank area comprising at least one crank segment, which extends over the total switching angle and between the end stops of which a stop element of said stop elements can assume one of n relative positions, which correspond to the n switching positions of said actuating element, wherein said crank segments assigned to said stop elements add up to a total crank angle of 360 degrees or a multiple thereof, and wherein one or more of said crank segments and said stop elements are arranged distributed over the total crank angle such that each of said n relative positions within one of said crank segments is occupied by one of said stop elements for each said relative switching position of said actuating element.

2. An actuating device in accordance with claim 1, wherein a number of m, where m>1, said crank areas or said crank segments are integrated into a multiple crank area or a multiple crank segment, wherein one or more said stop elements are assigned to said multiple crank area or said multiple crank segment.

3. An actuating device in accordance with claim 1, wherein said crank areas correspond to longitudinal sections of the surface of a cylindrical body.

4. An actuating device in accordance with claim 1, wherein said crank arrangement is essentially annular.

5. An actuating device in accordance with claim 4, wherein a certain annular partial surface area of said crank arrangement is assigned to each said crank area of said crank arrangement.

6. An actuating device in accordance with claim 5, wherein said partial surface area of said crank arrangement is assigned to a plurality of said crank areas.

7. An actuating device in accordance with claim 1, wherein said actuating element is essentially rotationally symmetrical.

8. An actuating device in accordance with claim 1, further comprising a locking means with a plurality of locking positions corresponding in number to the number of possible relative switching positions.

9. An actuating device in accordance with claim 8, wherein the locking positions are distributed uniformly over a full circumference of said actuating element.

10. An actuating device in accordance with claim 8, wherein said locking means has a circumferential locking contour and a spring-loaded locking element corresponding to said locking contour.

11. An actuating device in accordance with claim 10, further comprising a housing arrangement wherein said locking contour is made in one piece with a housing part of said housing arrangement.

12. An actuating device in accordance with claim 10, wherein said locking element is connected to said crank arrangement.

13. An actuating device in accordance with claim 1, further comprising: a control means for the controlled activation of said stop elements.

14. An actuating device in accordance with claim 13, further comprising: a sensor array, which can be connected to said control means, for determining the absolute angular position of said crank arrangement.

15. An actuating device in accordance with claim 13, further comprising: an actuator means, connected to said control means for each said stop element, for activating said stop element, wherein said actuator means can be driven by an auxiliary energy that can be fed by said control means.

16. An actuating device in accordance with claim 15, wherein said actuator means is set up such that said stop element is brought into the activated state or is held in the activated state when the auxiliary energy ceases to be present.

17. An actuating device in accordance with claim 15, wherein said actuator means has an electromagnetic drive for activating said stop element.

18. An actuating device in accordance with claim 17, wherein said stop element is formed by said armature rod of the electromagnet of said actuator means.

19. An actuating device in accordance with claim 1, further comprising a housing wherein said crank means is connected to said actuating element in such a way that said crank means and said actuating element rotate in unison, and said stop element is arranged as a rigid part of the housing.

20. An actuating device in accordance with claim 1, further comprising a housing a separate display means wherein said actuating device is connected to said separate display means.

21. An actuating device in accordance with claim 20, wherein said display means has a discrete display element for each switching position.

22. An actuating device in accordance with claim 21, wherein distances between said discrete display elements correspond to angle differences between the locking positions of said actuating element.

23. An actuating device in accordance with claim 1, wherein said actuating device comprises a display means.

24. An actuating device in accordance with claim 1, further comprising: a mechanical release for the manual deactivation of said stop elements.

* * * * *